US008333905B1

(12) United States Patent
Kurth et al.

(10) Patent No.: US 8,333,905 B1
(45) Date of Patent: *Dec. 18, 2012

(54) TRANSESTERIFIED POLYOL HAVING SELECTABLE AND INCREASED FUNCTIONALITY AND URETHANE MATERIAL PRODUCTS FORMED USING THE POLYOL

(75) Inventors: Thomas M. Kurth, Princeton, IL (US); Richard A. Kurth, Walnut, IL (US); Robert B. Turner, Georgetown, TX (US); Les P. Kreifels, Marseilles, IL (US); Todd A. Van Thomme, Grand Rapids, MI (US)

(73) Assignee: Tandem Polymers, Inc., San Diego, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/932,943

(22) Filed: Oct. 31, 2007

Related U.S. Application Data

(63) Continuation of application No. 09/944,212, filed on Aug. 31, 2001.

(60) Provisional application No. 60/251,068, filed on Dec. 4, 2000, provisional application No. 60/239,161, filed on Oct. 10, 2000, provisional application No. 60/230,463, filed on Sep. 6, 2000.

(51) Int. Cl.
*C09K 3/00* (2006.01)

(52) U.S. Cl. ............... 252/182.24; 252/182.28; 554/24; 554/30; 554/169

(58) Field of Classification Search .............. 252/182.24, 252/182.28; 554/24, 30, 169
See application file for complete search history.

(56) References Cited

U.S. PATENT DOCUMENTS

| | | | |
|---|---|---|---|
| 1,447,954 A | 3/1923 | Webster | |
| 2,167,266 A | 7/1939 | Kimball | |
| 2,556,336 A | 6/1951 | Nye | |
| 2,569,206 A | 9/1951 | Vogel | |
| 2,606,890 A | 8/1952 | Polly et al. | |
| 2,745,855 A | 5/1956 | Case | |
| 2,787,601 A | 4/1957 | Detrick et al. | |
| 2,833,730 A * | 5/1958 | Barthel, Jr. .................... | 521/159 |
| 3,001,958 A | 9/1961 | Schwarcman | |
| 3,396,473 A | 8/1968 | Turner | |
| 3,535,156 A | 10/1970 | Turner | |
| 3,576,929 A | 4/1971 | Turner et al. | |
| 3,639,312 A | 2/1972 | Turner | |
| 3,755,212 A | 8/1973 | Dunlap et al. | |
| 3,778,205 A | 12/1973 | Turner et al. | |
| 3,821,130 A | 6/1974 | Barron et al. | |
| 3,846,478 A | 11/1974 | Cummins | |
| 3,849,156 A | 11/1974 | Marlin et al. | |
| 3,862,879 A | 1/1975 | Barron et al. | |
| 3,963,699 A | 6/1976 | Rizzi et al. | |
| 3,985,814 A | 10/1976 | Dougherty | |
| 3,991,126 A | 11/1976 | Bacskai | |
| 4,005,035 A | 1/1977 | Deaver | |
| 4,010,183 A | 3/1977 | Quesada | |
| 4,022,941 A | 5/1977 | Prokai et al. | |
| 4,036,789 A | 7/1977 | Shim | |
| 4,045,498 A | 8/1977 | Deno | |
| 4,076,679 A | 2/1978 | Turner | |
| 4,116,987 A | 9/1978 | Deno | |
| 4,171,395 A | 10/1979 | Tillotson | |
| 4,185,146 A | 1/1980 | Burke | |
| 4,246,363 A | 1/1981 | Turner et al. | |
| 4,264,743 A | 4/1981 | Maruyama et al. | |
| 4,278,482 A | 7/1981 | Poteet et al. | |
| 4,286,003 A | 8/1981 | Higgins et al. | |
| 4,296,159 A | 10/1981 | Jenkines et al. | |
| 4,314,088 A | 2/1982 | Austin et al. | |
| 4,334,061 A | 6/1982 | Bossier, III | |
| 4,354,810 A | 10/1982 | Stidham | |
| 4,359,359 A | 11/1982 | Gerlach et al. | |
| 4,375,521 A | 3/1983 | Arnold | |
| 4,376,171 A | 3/1983 | Blount | |
| 4,390,739 A | 6/1983 | Michaelson et al. | |
| 4,393,253 A | 7/1983 | Michaelson et al. | |
| 4,405,393 A | 9/1983 | Tillotson | |
| 4,483,894 A | 11/1984 | Porter et al. | |
| 4,496,547 A | 1/1985 | Kawashima et al. | |
| 4,496,778 A | 1/1985 | Myers et al. | |
| 4,496,779 A | 1/1985 | Myers et al. | |
| 4,507,336 A | 3/1985 | Cenegy | |

(Continued)

FOREIGN PATENT DOCUMENTS

AU 704532 3/1997

(Continued)

OTHER PUBLICATIONS

Modern Plastics Encyclopedia, vol. 45: No. 14A, pp. 100-01, 113, 352, 354, 356, 358-360, McGraw-Hill Publications, Oct. 1968.
Grant & Hackh's Chemical Dictionary (1987), $5^{th}$ Ed., p. 89.
Handbook of Chemistry and Physics, pp. C-214-215, C-275, C-277, C-288-289, C-296-297, C-312-314, C-325-326, C-367, C-370-372, C-396-398, C-455, C-506, D-189-190, Robert C. Weast, Ph.D., CRC Press, Cleveland, OH (1974).
Encyclopedia of Food Technology, vol. 2, 1974, pp. 818-828, Arnold H. Johnson, Ph.D. and Martin S. Peterson, Ph.D., AVI Publishing Company, Inc., Westport, CT.
Soybeans: Chemistry and Technology, vol. 1, pp. 73-74, 438-441, Allan K. Smith, Ph.D. and Sidney J. Circle, Ph.D., AVI Publishing Company, Westport, CT (1978).

(Continued)

*Primary Examiner* — John Cooney
(74) *Attorney, Agent, or Firm* — Price Heneveld LLP

(57) ABSTRACT

The present invention includes a polyol produced according to the process comprising reacting a multifunctional alcohol with a first multifunctional component to form a reaction product and reacting the reaction product with a vegetable oil to form a polyol. The present invention also relates to the material comprising the reaction product of an A-side and a B-side, wherein the A-side comprises an isocyanate and the B-side comprises the product formed by the process comprising the steps of reacting a multifunctional alcohol with a first multifunctional component to form a precursor polyol and then reacting the precursor polyol with a vegetable oil to form a vegetable based polyol with selectable functionality.

20 Claims, No Drawings

U.S. PATENT DOCUMENTS

| | | |
|---|---|---|
| 4,508,853 A | 4/1985 | Kluth et al. |
| 4,512,831 A | 4/1985 | Tillotson |
| 4,515,646 A | 5/1985 | Walker et al. |
| 4,518,772 A | 5/1985 | Volpenhein |
| 4,530,941 A | 7/1985 | Turner et al. |
| 4,582,891 A | 4/1986 | Maki et al. |
| 4,585,804 A | 4/1986 | Lancaster et al. |
| 4,595,436 A | 6/1986 | Walker et al. |
| 4,611,044 A | 9/1986 | Meyer et al. |
| 4,642,320 A | 2/1987 | Turner et al. |
| 4,657,790 A | 4/1987 | Wing et al. |
| 4,686,242 A | 8/1987 | Turner et al. |
| 4,687,788 A | 8/1987 | Hillshafer et al. |
| 4,696,849 A | 9/1987 | Mobley et al. |
| 4,701,475 A | 10/1987 | Turner |
| 4,720,571 A | 1/1988 | Trowell |
| 4,734,455 A | 3/1988 | Mobley et al. |
| 4,740,367 A | 4/1988 | Force et al. |
| 4,742,087 A | 5/1988 | Kluth et al. |
| 4,745,135 A | 5/1988 | Thomas et al. |
| 4,745,136 A | 5/1988 | Thomas et al. |
| 4,745,137 A | 5/1988 | Thomas et al. |
| 4,798,849 A | 1/1989 | Thomas et al. |
| 4,806,632 A | 2/1989 | McCoy et al. |
| 4,825,004 A | 4/1989 | Rutzen et al. |
| 4,843,138 A | 6/1989 | Tazewell et al. |
| 4,853,054 A | 8/1989 | Turner et al. |
| 4,853,280 A | 8/1989 | Poteet |
| 4,861,803 A | 8/1989 | Turner |
| 4,913,958 A | 4/1990 | Skaggs et al. |
| 4,931,552 A | 6/1990 | Gibson et al. |
| 4,942,278 A | 7/1990 | Sheinberg et al. |
| 4,943,626 A | 7/1990 | McGrath et al. |
| 4,952,687 A | 8/1990 | Bodor et al. |
| 4,968,791 A | 11/1990 | Van Der Plank |
| 4,973,681 A | 11/1990 | Watanabe |
| 4,980,388 A | 12/1990 | Herrington et al. |
| 5,010,117 A | 4/1991 | Herrington et al. |
| 5,021,256 A | 6/1991 | Guffey et al. |
| 5,032,622 A | 7/1991 | Herrington et al. |
| 5,043,438 A | 8/1991 | Buter |
| 5,071,975 A | 12/1991 | Ver Der Plank et al. |
| 5,104,693 A | 4/1992 | Jenkines |
| 5,104,910 A | 4/1992 | Turner et al. |
| 5,106,874 A | 4/1992 | Porter et al. |
| 5,106,884 A | 4/1992 | Turner et al. |
| 5,106,967 A | 4/1992 | Mazur |
| 5,126,494 A | 6/1992 | Gilheany et al. |
| 5,194,281 A | 3/1993 | Johnston et al. |
| 5,225,049 A | 7/1993 | Barmentlo et al. |
| 5,231,199 A | 7/1993 | Willemse |
| 5,274,145 A | 12/1993 | Gubelmann |
| 5,324,846 A | 6/1994 | Hirshman et al. |
| 5,397,810 A | 3/1995 | Ozaki et al. |
| 5,440,027 A | 8/1995 | Hasenhuettl |
| 5,447,963 A | 9/1995 | Pcolinsky et al. |
| 5,482,980 A | 1/1996 | Pcolinsky |
| 5,491,174 A | 2/1996 | Grier et al. |
| 5,491,226 A | 2/1996 | Kenneally |
| 5,496,869 A | 3/1996 | Williams et al. |
| 5,504,145 A | 4/1996 | Treasurer |
| 5,504,202 A | 4/1996 | Hutchison |
| 5,571,935 A | 11/1996 | Sekula et al. |
| 5,576,027 A | 11/1996 | Friedman et al. |
| 5,627,221 A | 5/1997 | Schumacher et al. |
| 5,629,434 A | 5/1997 | Cusumano et al. |
| 5,648,483 A | 7/1997 | Granberg et al. |
| 5,681,948 A | 10/1997 | Miller et al. |
| 5,688,860 A | 11/1997 | Croft |
| 5,698,722 A | 12/1997 | Cusumano et al. |
| 5,710,190 A | 1/1998 | Jane et al. |
| 5,756,195 A | 5/1998 | Allen et al. |
| 5,766,704 A | 6/1998 | Allen et al. |
| 5,767,257 A | 6/1998 | Schafermeyer et al. |
| 5,795,949 A | 8/1998 | Daute et al. |
| 5,811,129 A | 9/1998 | Friedman et al. |
| 5,834,529 A | 11/1998 | Reese et al. |
| 5,859,270 A | 1/1999 | Kolstad et al. |
| 5,869,546 A | 2/1999 | Gruss et al. |
| 5,900,496 A | 5/1999 | Hou |
| 5,908,701 A | 6/1999 | Jennings et al. |
| 5,922,779 A | 7/1999 | Hickey |
| 5,945,529 A | 8/1999 | Corrigan et al. |
| 6,015,440 A | 1/2000 | Noureddini |
| 6,051,623 A | 4/2000 | Stielau |
| 6,080,853 A | 6/2000 | Corrigan et al. |
| 6,096,401 A | 8/2000 | Jenkines |
| 6,107,433 A | 8/2000 | Petrovic et al. |
| 6,121,398 A | 9/2000 | Wool et al. |
| 6,133,329 A | 10/2000 | Shieh et al. |
| 6,174,501 B1 | 1/2001 | Noureddini |
| 6,180,686 B1 | 1/2001 | Kurth |
| 6,258,869 B1 | 7/2001 | Shah et al. |
| 6,278,006 B1 * | 8/2001 | Kodali et al. .................. 554/30 |
| 6,288,133 B1 | 9/2001 | Hagquist |
| 6,359,023 B1 | 3/2002 | Kluth et al. |
| 6,388,002 B1 | 5/2002 | Baker et al. |
| 6,420,446 B1 | 7/2002 | Chang |
| 6,465,569 B1 | 10/2002 | Kurth |
| 6,500,974 B2 | 12/2002 | Thengumpillil et al. |
| 6,624,244 B2 | 9/2003 | Kurth |
| 6,649,667 B2 | 11/2003 | Clatty |
| 6,864,296 B2 | 3/2005 | Kurth |
| 6,867,239 B2 | 3/2005 | Kurth |
| 6,881,763 B2 | 4/2005 | Kurth |
| 6,962,636 B2 | 11/2005 | Kurth et al. |
| 6,979,477 B2 | 12/2005 | Kurth et al. |
| 7,063,877 B2 | 6/2006 | Kurth et al. |
| 7,084,230 B2 | 8/2006 | Kurth et al. |
| 7,098,291 B2 | 8/2006 | Brinkman |
| 7,537,665 B2 | 5/2009 | Kurth et al. |
| 7,595,094 B2 | 9/2009 | Kurth et al. |
| 2002/0058774 A1 | 5/2002 | Kurth et al. |
| 2002/0090488 A1 | 7/2002 | Kurth et al. |
| 2002/0119321 A1 | 8/2002 | Kurth et al. |
| 2002/0121328 A1 | 9/2002 | Kurth et al. |
| 2002/0192456 A1 | 12/2002 | Mashburn et al. |
| 2003/0143910 A1 | 7/2003 | Mashburn et al. |
| 2003/0191274 A1 | 10/2003 | Kurth et al. |
| 2003/0232956 A1 | 12/2003 | Brinkman |
| 2004/0029988 A1 | 2/2004 | Kurth |
| 2004/0034163 A1 | 2/2004 | Kurth |
| 2004/0102596 A1 | 5/2004 | Kurth |
| 2004/0209971 A1 | 10/2004 | Kurth et al. |
| 2005/0131092 A1 | 6/2005 | Kurth et al. |
| 2005/0131093 A1 | 6/2005 | Kurth et al. |
| 2005/0260351 A1 | 11/2005 | Kurth et al. |
| 2007/0232816 A1 | 10/2007 | Soi et al. |
| 2009/0223620 A1 | 9/2009 | Kurth et al. |

FOREIGN PATENT DOCUMENTS

| | | |
|---|---|---|
| CA | 2144467 | 9/1995 |
| CA | 2213564 | 8/1997 |
| CA | 2263990 | 2/1998 |
| DE | 1504093 | 9/1969 |
| DE | 3316652 | 12/1984 |
| DE | 3702615 | 8/1988 |
| DE | 4332292 | 3/1995 |
| DE | 19643816 | 5/1998 |
| EP | 0672697 | 9/1995 |
| EP | 0826706 | 10/1998 |
| JP | 349894 | 1/1956 |
| JP | 54063197 | 4/1979 |
| JP | 61000215 | 6/1986 |
| JP | 62294538 | 12/1987 |
| JP | 01118517 | 5/1989 |
| JP | 05186556 | 7/1993 |
| JP | 07109326 | 4/1995 |
| JP | 7304842 | 11/1995 |
| JP | 08225628 | 9/1996 |
| JP | 10087777 | 4/1998 |
| WO | 9612759 | 5/1996 |
| WO | 9707150 | 2/1997 |
| WO | 9807777 | 2/1998 |
| WO | 9912987 | 3/1999 |
| WO | 0015684 | 3/2000 |

| | | |
|---|---|---|
| WO | 0023491 | 4/2000 |
| WO | 0104225 | 1/2001 |
| WO | 0170842 | 9/2001 |

OTHER PUBLICATIONS

Rigid Plastics Foams, $2^{nd}$ Edition, pp. 2-5, T.H. Ferrigno, Reinhold Publishing Corporation, New York (1967).

Handbook of Soy Oil Processing and Utilization, entitled "Composition of Soybean Oil," Chap. 2, E. H. Pryde, pp. 13-19, American Soybean Association, St. Louis, MO and American Oil Chemists' Society, Champaign, IL (1980).

Oertel, Dr. Günter, Polyurethane Handbook, "Chemical and Physical-Chemical Principles," Hanser Publishers, p. 8 (1985).

"Structure and Properties of Polyurethanes Based on Halogenated and Nonhalogentated Soy-Polyols," Zoran S. Petrovic, Andrew Guo, and Wei Zhang, Journal of Polymer Science: Part A: Polymer Chemistry, vol. 38, pp. 4062-4069, (Sep. 26, 2000).

Römpp Online Dictonary, Georg Thieme Verlag, "Autoxidation," document identification RD-01-04007, Jul. 2004.

"Rigid Polyurethane Foams Based on Soybean Oil," Andrew Guo, Ivan Javni, and Zoran Petrovic, Journal of Applied Polymer Science, vol. 77, pp. 467-473, (Jul. 11, 2000).

Römpp Online Dictonary, Georg Thieme Verlag, "Oxystearin," document identification RD-15-01361, May 2004.

"Effect of Structure on Properties of Soy-Based Polyols and Polyurethanes," Zoran S. Petrovic, Andrew Guo, Ivan Javni, and Wei Zhang (2000).

Excerpt from "Römpp's Chemistry Lexicon," vol. 5, $9^{th}$ edition, Georg Thieme Verlag, pp. 4198-4199 (1992).

"Renewable Raw Materials—An Important Basis for Urethane Chemistry," Urethane Technology, vol. 14, No. 2, pp. 20-24, Apr./May 1997, Crain Communications.

Excerpt from "Plastics Handbook," vol. 7, Polyurethanes, $2^{nd}$ edition, Carl Hanser Verlag, pp. 92-96 (1983).

"Morphology of Water-Blown Flexible Polyurethane Foams, "Armisted et al., Journal of Applied Polymer Science, vol. 35, pp. 601-629, 1988.

"Transesterification of Vegetable Oils: a Review," Schuchardt, Sercheli and Vargas, J. Braz. Chem. Soc., vol. 9, No. 1, 199-210, 1998.

"Model/MDI/Butendiol Polyurethanes: Molecular Structure Morphology, Physical and Mechanical Properties," Christenson et al., Journal of Polymer Science; Part B: Polymer Physics, vol. 24, pp. 1401-1439, Jul. 1986.

"Chemoenzymatic Synthesis of Urethane Oil Based on Special Functional Group Oil," M.D. Bhabhe and V.D. Athawate, Journal of Applied Polymer Science, vol. 69, pp. 1451-1458 (1998).

Nakamura et al., "Preparation of Polyurethane Foam From Waste Vegetable Oil," Kobunshi Robunshu, translated by The Ralph McElroy Translation Company, vol. 50 (11), pp. 881-886, (1993).

Colvin et al., UTECH Asia, "Low Cost Polyols from Natural Oils," Paper 36, 1995.

U.S. Appl. No. 11/933,019, filed Oct. 31, 2007, to Kurth et al.

\* cited by examiner

TRANSESTERIFIED POLYOL HAVING SELECTABLE AND INCREASED FUNCTIONALITY AND URETHANE MATERIAL PRODUCTS FORMED USING THE POLYOL

CROSS-REFERENCE TO RELATED APPLICATIONS

This application is a continuation of U.S. patent application Ser. No. 09/944,212 filed on Aug. 31, 2001 entitled "TRANSESTERIFIED POLYOL HAVING SELECTABLE AND INCREASED FUNCTIONALITY AND URETHANE MATERIAL PRODUCTS FORMED USING THE POLYOL", the disclosure of which is hereby incorporated by reference in its entirety. U.S. patent application Ser. No. 09/944,212 claims priority to the following U.S. Provisional Patent Applications: U.S. Provisional Patent Application Ser. No. 60/251,068 entitled, "TRANSESTERIFIED POLYOL HAVING SELECTABLE AND INCREASED FUNCTIONALITY AND URETHANE PRODUCTS FORMED USING THE POLYOL", by Thomas M. Kurth et al., filed Dec. 4, 2000, the disclosure of which is hereby incorporated by reference; U.S. Provisional Patent Application Ser. No. 60/239,161 entitled, "TRANSESTERIFIED POLYOL HAVING SELECTABLE AND INCREASED FUNCTIONALITY AND URETHANE PRODUCTS FORMED USING THE POLYOL", by Thomas M. Kurth et al., filed Oct. 10, 2000, the disclosure of which is hereby incorporated by reference; and U.S. Provisional Patent Application Ser. No. 60/230,463 entitled, "TRANSESTERIFIED POLYOL HAVING SELECTABLE AND INCREASED FUNCTIONALITY AND URETHANE PRODUCTS FORMED USING THE POLYOL", by Thomas M. Kurth et al., filed Sep. 6, 2000, the disclosure of which is hereby incorporated by reference.

BACKGROUND OF THE INVENTION

Because of their widely ranging mechanical properties and their ability to be relatively easily machined and formed, plastic foams and elastomers have found wide use in a multitude of industrial and consumer applications. In particular, urethane materials, such as foams and elastomers, have been found to be well suited for many applications. Automobiles, for instance, contain a number of components, such as cabin interior parts, that are comprised of urethane foams and elastomers. Urethane foams are also used as carpet backing. Such urethane foams are typically categorized as flexible, semi-rigid, or rigid foams with flexible foams generally being softer, less dense, more pliable, and more subject to structural rebound subsequent to loading than rigid foams.

The production of urethane foams and elastomers are well known in the art. Urethanes are formed when isocyanate (NCO) groups react with hydroxyl (OH) groups. The most common method of urethane production is via the reaction of a polyol and an isocyanate, which forms the backbone urethane group. A cross-linking agent and/or chain extender may also be added. Depending on the desired qualities of the final urethane product, the precise formulation may be varied. Variables in the formulation include the type and amounts of each of the reactants and additives.

In the case of a urethane foam, a blowing agent is added to cause gas or vapor to be evolved during the reaction. The blowing agent is one element that assists in creating the size of the void cells in the final foam, and commonly is a solvent with a relatively low boiling point or water. A low boiling solvent evaporates as heat is produced during the exothermic isocyanate/polyol reaction to form vapor bubbles. If water is used as a blowing agent, a reaction occurs between the water and the isocyanate group to form an amine and carbon dioxide ($CO_2$) gas in the form of bubbles. In either case, as the reaction proceeds and the material solidifies, the vapor or gas bubbles are locked into place to form void cells. Final urethane foam density and rigidity may be controlled by varying the amount or type of blowing agent used.

A cross-linking agent is often used to promote chemical cross-linking to result in a structured final urethane product. The particular type and amount of cross-linking agent used will determine final urethane properties such as elongation, tensile strength, tightness of cell structure, tear resistance, and hardness. Generally, the degree of cross-linking that occurs correlates to the flexibility of the final foam product. Relatively low molecular weight compounds with greater than single functionality are found to be useful as cross-linking agents.

Catalysts may also be added to control reaction times and to effect final product qualities. The catalysts generally effect the speed of the reaction. In this respect, the catalyst interplays with the blowing agent to effect the final product density. Preferably, for foam urethane production, the reaction should proceed at a rate such that maximum gas or vapor evolution coincides with the hardening of the reaction mass. The catalyst may also effect the timing or speed of curing so that a urethane foam may be produced in a matter of minutes instead of hours.

Polyols currently used in the production of urethanes are petrochemicals being generally derived from propylene or ethylene oxides. Polyester polyols and polyether polyols are the most common polyols used in urethane production. For flexible foams, polyester or polyether polyols with molecular weights greater than 2,500, are generally used. For semi-rigid foams, polyester or polyether polyols with molecular weights of 2,000 to 6,000 are generally used, while for rigid foams, shorter chain polyols with molecular weights of 200 to 4,000 are generally used. There is a very wide variety of polyester and polyether polyols available for use, with particular polyols being used to engineer and produce a particular urethane elastomer or foam having desired particular final toughness, durability, density, flexibility, compression set ratios and modulus, and hardness qualities. Generally, higher molecular weight polyols and lower functionality polyols tend to produce more flexible foams than do lower molecular weight polyols and higher functionality polyols. In order to eliminate the need to produce, store, and use different polyols, it would be advantageous to have a single, versatile, renewable component that was capable of being used to create final urethane foams of widely varying qualities.

Use of petrochemicals such as, polyester or polyether polyols is disadvantageous for a variety of reasons. As petrochemicals are ultimately derived from petroleum, they are a non-renewable resource. The production of a polyol requires a great deal of energy, as oil must be drilled, extracted from the ground, transported to refineries, refined, and otherwise processed to yield the polyol. These required efforts add to the cost of polyols and to the disadvantageous environmental effects of its production. Also, the price of polyols tends to be somewhat unpredictable. Their price tends to fluctuate based on the fluctuating price of petroleum.

Also, as the consuming public becomes more aware of environmental issues, there are distinct marketing disadvantages to petrochemical based products. Consumer demand for "greener" products continues to grow. As a result, it would be most advantageous to replace polyester or polyether polyols, as used in the production of urethane elastomers and foams, with more versatile, renewable, less costly, and more environmentally friendly components.

The difficulties in the past that occurred due to the use of vegetable oil as the polyols to produce a urethane product include the inability to regulate the functionality of the polyol resulting in variations in urethane product where the industry demands relatively strict specifications be met and the fact that urethane products, in the past, outperformed vegetable oil based products in quality tests, such as carpet backing pull tests.

An unresolved need therefore exists for an improved functionality, vegetable oil based polyol of increased and selectable functionality for use in manufacturing a urethane materials such as, elastomers and foams. Also needed is a method of producing such urethane materials using the improved functionality, vegetable oil based polyol based on a reaction between isocyanates alone or as a prepolymer, in combination with the improved functionality polyol or a blend of the improved functionality polyol and other polyols including petrochemical based polyols. The products and methods of the present invention are particularly desirable because they relate to relatively inexpensive, versatile, renewable, environmentally friendly materials such as, vegetable oil, more particularly blown soy oil, transesterified with a saccharide, polysaccharide, or a sugar alcohol to form a polyol of increased and selectable functionality that can be a replacement for soy or petroleum based polyether or polyester polyols typically employed.

SUMMARY OF THE INVENTION

This invention generally relates to a new pre-coat backing system for carpeting using a vegetable based polyol having increased and selectable functionality. The pre-coat backing system is comprised of tufts, a primary backing and a pre-coat backing. Generally, the tufts are interconnected through the primary backing, while the primary backing is generally comprised of polypropylene. The pre-coat backing is comprised of the reaction product of an A-side and a B-side, wherein the A-side is comprised of an isocyanate and the B-side is comprised of a vegetable oil, an optional cross-linking agent and a catalyst. This invention also generally relates to the use of transesterified polyols in all urethane containing products, as well as the use of transesterified polyols in specific applications. Such applications include use in the residential and commercial carpet foam backing industry.

These and other features, advantages and objects of the present invention will be further understood and appreciated by those skilled in the art by reference to the following specification, claims, and appended drawings.

DETAILED DESCRIPTION OF THE PREFERRED EMBODIMENTS

A new vegetable oil based polyol having increased and selectable functionality has been developed. A two-stage transesterification process produces the new vegetable oil based polyol as the reaction product of a multifunctional alcohol and a multifunctional component, subsequently reacted with a vegetable oil. In the first step in the two-stage transesterification process, glycerin, a suitable multifunctional alcohol, or other suitable multifunctional alcohol is heated to about 230° F., and advantageously also stirred; however, a catalyst may be used instead of or in addition to heat. Next, a multifunctional component having at least two hydroxyl groups preferably includes a saccharide compound, typically a monosaccharide, disaccharide, a polysaccharide, sugar alcohol, cane sugar, honey, or mixture thereof is slowly introduced into the glycerin until saturated. Currently, the preferred saccharide components are fructose and cane sugar. Cane sugar provides greater tensile strength and fructose provides greater elongation of the carbon chain of the polyol. Preferably, 2 parts of the saccharide compound is added to 1 part of the multifunctional alcohol, by weight. Glycerin is a carrier for the saccharide compound component, although it does add some functional hydroxyl groups. The saccharide component is slowly added until no additional saccharide component can be added to the glycerin solution.

It is believed that the multifunctional alcohol and the saccharide component undergo an initial transesterification to form new ester products (precursors). As such, the functionality of the new polyol is selectable. The greater the functionality of the alcohol, the greater the functionality of the final new polyol.

Next, from about 200 to 300 grams (experimental amount) of vegetable oil, preferably soy oil, and most preferably blown soy oil, is heated to at least about 180° F. However, the temperature may be any temperature from about 180° F. until the oil is damaged. Blown soy oil provides superior results to regular vegetable oil; however, any vegetable oil or blown vegetable oil will work. Other vegetable oils that may be utilized in the present invention include, but should not be limited to, palm oil, safflower oil, sunflower oil, canola oil, rapeseed oil, cottonseed oil, linseed, and coconut oil. When these vegetable oils are used, they too are preferably blown. However, the vegetable oils may be crude vegetable oils or crude vegetable oils that have had the soap stock and wax compound in the crude oil removed.

Once the blown soy oil has been heated, it is slowly reacted with the heated glycerin/saccharide ester, the first transesterification reaction product. The vegetable oil and the first transesterification product undergo a second transesterification reaction that increases the functionality of the resulting polyol. Lowering the amount of the saccharide component added to the vegetable oil lowers the number of functional groups available to be cross-linked with an isocyanate group when the polyol produced using the two-stage transesterification process outlined above is used to create a urethane product. In this manner, functionality of the final polyol produced by the transesterification process of the present invention may be regulated and engineered. Therefore, more rigid urethane products are formed using a polyol produced by the present invention by using increased amounts of a saccharide component. In addition, as discussed above, higher functionality of the multifunctional alcohol may also increase the functionality of the urethane products formed using the new polyol.

Also, Applicants currently believe that polyols having increased functionality can not only be made by the transesterification process discussed above alone, but a further increase in functionality of the vegetable oil based polyol may also be achieved by propoxylation, butyoxylation, or ethoxylation. Applicants believe that the addition of propylene oxide (propoxylation), ethylene oxide (ethoxylation), butylene oxide, (butyloxylation), or any other known alkene oxides to a vegetable oil, a crude vegetable oil, a blown vegetable oil, the reaction product of the saccharide (multifunctional compound) and the multifunctional alcohol, or the final vegetable oil based, transesterified polyol produced according to the transesterification process discussed above will further increase the functionality of the polyol thereby formed.

Moreover, it has been contemplated that the above described transesterification process may be performed on crude or non-blown vegetable (soy) oil prior to blowing the vegetable (soy) oil to form a pre-transesterified vegetable (soy) oil. The pre-transesterified vegetable (soy) oil may then be blown, as known, to increase its functionality. Thereafter, the transesterification process discussed above may optionally be carried out again on the blown pre-transesterified vegetable (soy) oil.

A transesterification catalyst such as tetra-2-ethylhexyl titonate, which is marketed by DuPont® as Tyzor® TOT, may be used, instead of or in addition to heat. Also, known acids and other transesterification catalysts known to those of ordinary skill may also be used.

The preparation of urethanes is well known in the art. They are generally produced by the reaction of petrochemical polyols, either polyester or polyether, with isocyanates. The flexibility or rigidity of the foam is dependent on the molecular weight and functionality of the polyol and isocyanate used.

Petrochemical polyol based polyurethanes can be prepared when what is known in the art as an A-side reactant is combined with what is known in the art as a B-side reactant. The A-side reactant of the urethane of the invention comprises an isocyanate, typically a diisocyanate such as: 4,4' diphenylmethane diisocyanate; 2,4 diphenylmethane diisocyanate; and modified diphenylmethane diisocyanate. Typically, a modified diphenylmethane diisocyanate is used. Mondur MR Light®, an aromatic polymeric isocyanate based on diphenylmethane-diisocyanate, and Mondur® MA-2903, a new generation MDI prepolymer, manufactured by Bayer® Corporation, are two specific examples of possible isocyanates that can be used. It should be understood that mixtures of different isocyanates may also be used. The particular isocyanate or isocyanate mixture used is not essential and can be selected for any given purpose or for any reason as desired by one of ordinary skill in the art.

The A-side of the reaction may also be a prepolymer isocyanate. The prepolymer isocyanate is the reaction product of an isocyanate, preferably a diisocyanate, and most preferably some form of diphenylmethane diisocyanate (MDI) and a vegetable oil. The vegetable oil can be any of the vegetables discussed previously or any other oil having a suitable number of reactive hydroxyl (OH) groups. Soy oil is particularly advantageous to use. To create the prepolymer diisocyanate, the vegetable oil, the transesterified vegetable oil or a mixture of vegetable oils and transesterified vegetable oils are mixed and allowed to react until the reaction has ended. There may be some unreacted isocyanate (NCO) groups in the prepolymer. However, the total amount of active A-side material has increased through this process. The prepolymer reaction reduces the cost of the A-side component by decreasing the amount of isocyanate required and utilizes a greater amount of inexpensive, environmentally friendly vegetable (soy) oil. Alternatively, after the A-side prepolymer is formed, additional isocyanates may be added.

The B-side material is generally a solution of a petroleum based polyester or polyether polyol, cross-linking agent, and blowing agent. A catalyst is also generally added to the B-side to control reaction speed and effect final product qualities. As discussed infra, the use of a petrochemical such as, a polyester or polyether polyol is undesirable for a number of reasons.

It has been discovered that urethane materials of high quality can be prepared by substituting the petroleum based polyol in the B-side preparation with the increased and selectable functionality polyol produced by the transesterification process outlined above. Using Applicants' method permits substantial regulation of the functionality of the resulting polyol thereby making the polyols produced by Applicants' new process more desirable to the industry. Previously, the functionality of vegetable oil based polyols varied dramatically due to, for example, genetic or environmental reasons.

In addition to the increased and selectable functionality polyol produced by the transesterification process outlined above, the B-side of the urethane reaction may include a cross-linking agent. Surprisingly, a cross-linking agent is not required when using the new transesterified polyol to form a urethane product. Typically, a blowing agent and a catalyst are also used in the B-side of the reaction. These components are also optional, but are typically used to form urethane product, especially foams.

A currently preferred blown soy oil typically has the following composition; however, the amounts of each component vary over a wide range. These values are not all inclusive. Amounts of each components of the oil vary due to weather conditions, type of seed, soil quality and various other environmental conditions:

| 100% Pure Soybean Oil Air Oxidized | |
|---|---|
| Moisture | 1.15% |
| Free Fatty Acid | 1-6%, typically ≈3% |
| Phosphorous | 50-200 ppm |
| Peroxide Value | 50-290 Meq/Kg |
| Iron | ≈6.5 ppm (naturally occurring amount) |
| Hydroxyl Number | 42-220 mgKOH/g |
| Acid Value | 5-13 mgKOH/g |
| Sulfur | ≈200 ppm |
| Tin | <.5 ppm |

Blown soy oil typically contains a hydroxyl value of about 100-180 and more typically about 160, while unblown soy oil typically has a hydroxyl value of about 30-40. The infrared spectrum scans of two samples of the type of blown soy oil used in the present invention are shown in FIGS. 1 and 2. Blown soy oil and transesterified soy oil produced according to the present invention have been found to have a glass transition at about −137° C. to about −120° C. depending on the saccharide component used and whether one is used at all. The glass transition measures the first signs of molecular movement in the polymer at certain temperatures. The glass transition can be measured using a Dynamic Mechanical Thermal (DMT) analysis machine. Rheometric Scientific is one manufacturer of DMT machines useful with the present invention. Applicants specifically utilize a DMTA5 machine from Rheometric Scientific.

Except for the use of the transesterified polyol replacing the petroleum based polyol, the preferred B-side reactant used to produce urethane foam is generally known in the art. Accordingly, preferred blowing agents, which may be used for the invention, are those that are likewise known in the art and may be chosen from the group comprising 134A HCFC, a hydrochlorofluorocarbon refrigerant available from Dow Chemical Co. of Midland, Mich.; methyl isobutyl ketone (MIBK); acetone; a hydrofluorocarbon; cyclopentane; methylene chloride; any hydrocarbon; and water or mixtures thereof. Presently, a mixture of cyclopentane and water is preferred. Another possible blowing agent is ethyl lactate, which is derived from soybeans and is bio-based. At present, water is the preferred blowing agent when a blowing agent is used. The blowing agents, such as water, react with the isocyanate (NCO) groups, to produce a gaseous product. The concentrations of other reactants may be adjusted to accommodate the specific blowing agent used in the reaction.

As discussed above, when blown soy oil is used to prepare the transesterified polyol of the B-side, the chain extender (cross-linking agent) may be removed from the B-side of the urethane reactions and similar properties to urethane products produced using soy oil according to the teachings of WO 00/15684 and U.S. Pat. No. 6,180,686, the disclosures of which are hereby incorporated by reference, are achieved.

If cross-linking agents are used in the urethane products of the present invention, they are also those that are well known in the art. They must be at least di-functional (a diol). The preferred cross-linking agents for the foam of the invention are ethylene glycol; 1,4 butanediol; diethanol amines; ethanol amines; tripropylene glycol, however, other diols and triols or greater functional alcohols may be used. It has been found that a mixture of tripropylene glycol; 1,4 butanediol; and diethanol amines are particularly advantageous in the practice of the present invention. Dipropylene glycol may also be used as a cross-linking agent. Proper mixture of the cross-linking agents can create engineered urethane products of almost any desired structural characteristics.

In addition to the B-side's vegetable oil, the optional blowing agent(s), and optional cross-linking agents, one or more catalysts may be present. The preferred catalysts for the urethanes of the present invention are those that are generally known in the art and are most preferably tertiary amines chosen from the group comprising DABCO 33-LV® comprised of 33% 1,4 diaza-bicycico-octane (triethylenediamine) and 67% dipropylene glycol, a gel catalyst available from the Air Products Corporation; DABCO® BL-22 blowing catalyst available from the Air Products Corporation; POLYCAT® trimerization catalyst available from the Air Products Corporation; Dibutyltin dilaurate; Dibutyltin diacetate; stannous octane; Air Products' DBU® (1,8 Diazabicyclo [5.4.0] dibutyltin dilaurate); and Air Products' DBU® (1,8 Diazabicyclo[5.4.0]dibutyltin diacetate). Other amine catalysts, including any metal catalysts, may also be used and are known by those of ordinary skill in the art.

Also as known in the art, when forming foam urethane products, the B-side reactant may further comprise a silicone surfactant which functions to influence liquid surface tension and thereby influence the size of the bubbles formed and ultimately the size of the hardened void cells in a final urethane foam product. This can effect foam density and foam rebound (index of elasticity of foam). Also, the surfactant may function as a cell-opening agent to cause larger cells to be formed in the foam. This results in uniform foam density, increased rebound, and a softer foam.

A molecular sieve may further be present to absorb excess water from the reaction mixture. The preferred molecular sieve of the present invention is available under the trade name L-paste™.

The urethane materials (products) of the present invention are produced by combining the A-side reactant with the B-side reactant in the same manner as is generally known in the art. Advantageously, use of the transesterified polyol to replace the petroleum based polyol does not require significant changes in the method of performing the reaction procedure. Upon combination of the A and B side reactants, an exothermic reaction ensues that may reach completion in anywhere from a few seconds (approximately 2-4) to several hours or days depending on the particular reactants and concentrations used. Typically, the reaction is carried out in a mold or allowed to free rise. The components may be combined in differing amounts to yield differing results, as will be shown in the Examples presented below.

A petroleum based polyol such as polyether polyol (i.e., Bayer corporation's Multranol® 3901 polyether polyol and Multranol® 9151 polyether polyol), polyester polyol, or polyurea polyol may be substituted for some of the transesterified polyol in the B-side of the reaction, however, this is not necessary. This preferred B-side formulation is then combined with the A-side to produce a urethane material. The preferred A-side, as discussed previously, is comprised of methylenebisdiphenyl diisocyanate (MDI) or a prepolymer comprised of MDI and a vegetable oil, preferably soy oil or a prepolymer of MDI and the transesterified polyol.

Flexible urethane foams may be produced with differing final qualities by not only regulating the properties of the transesterified polyol, but by using the same transesterified polyol and varying the particular other reactants chosen. For instance, it is expected that the use of relatively high molecular weight and high functionality isocyanates will result in a less flexible foam than will use of a lower molecular weight and lower functionality isocyanate when used with the same transesterified polyol. Likewise, as discussed earlier, the higher the functionality of the polyol produced by the transesterification process, the more rigid the foam produced using it will be. Moreover, it has been contemplated that chain extenders may also be employed in the present invention. For example, butanediol, in addition to acting as a cross-linker, may act as a chain extender.

Urethane elastomers can be produced in much the same manner as urethane foams. It has been discovered that useful urethane elastomers may be prepared using the transesterified polyol to replace some of or all of the petroleum based polyester or the polyether polyol. The preferred elastomer of the invention is produced using diphenylmethane diisocyanate (MDI) and the transesterified polyol. A catalyst may be added to the reaction composition. The resulting elastomer has an approximate density of about 52 lb. to about 75 lb. per cubic foot.

The following examples are the preparation of transesterified polyol of the present invention, as well as foams and elastomers of the invention formed using the transesterified polyol. The examples will illustrate various embodiments of the invention. The A-side material in the following examples is comprised of modified diphenylmethane diisocyanate (MDI), unless otherwise indicated; however, any isocyanate compound could be used.

Also, "cure," if used in the following examples, refers to the final, cured urethane product taken from the mold. The soy oil used in the following examples is blown soy oil. Catalysts used include "DABCO 33-LV®," comprised of 33% 1,4-diaza-bicycloctane and 67% dipropylene glycol available from the Air Products Urethanes Division; "DABCO® BL-22," a tertiary amine blowing catalyst also available from the Air Products Urethanes Division; "POLYCAT® 41" (m, n', n", dimethylamino-propyl-hexahydrotriazine tertiary amine) also available from the Air Products Urethanes Division; dibutyltin dilaurate (T-12); dibutyltin diacetate (T-1); and Air Products DBU® (1,8 Diazabicyclo [5.4.0]). The structures of the Air Products DBU®'s (1,8 Diazabicyclo [5.4.0]) used in the present invention are shown in FIG. 4.

A blowing catalyst in the following examples effects the timing of the activation of the blowing agent. Some of the examples may include "L-paste™," which is a trade name for a molecular sieve for absorbing water. Some may also contain "DABCO® DC-5160" or "Air Products DC193®", both are silicone surfactants available from Air Products Urethane Division.

EXAMPLES

All percentages referred to in the following examples refer to weight percent, unless otherwise noted.

Example 1

| Transesterification | |
|---|---|
| 2.5% | Glycerin |
| 5.0% | Sorbitol |
| 92.5% | Polyurea polyol and Blown soy oil mixture |
| Elastomer Formation | |

B-side:
| | | |
|---|---|---|
| | 97 g | Transesterified polyol formed above |
| | | Air Products DBU ® = urethane catalyst |
| | | (1,8 Diazabicyclo [5.4.0]) |
| | 3% | Butanediol (cross-linker) |
| A-side: | | Modified monomeric MDI (Mondur ® MA-2903) |

The B-side was combined with the A-side in a ratio of 55 parts A-side to 100 parts B-side.

Example 2

| Transesterification | |
|---|---|
| 2.5% | Glycerin |
| 5.0% | Sorbitol |
| 92.5% | Polyurea polyol and Blown soy oil |
| Elastomer Formation | |

B-side:
| | | |
|---|---|---|
| | 97% | Transesterified polyol formed above |
| | | Air Products DBU ® = urethane catalyst |
| | | (1,8 Diazabicyclo [5.4.0]) |
| | 3% | Dipropylene glycol (chain extender) |
| A-side: | | Modified monomeric MDI (Mondur ® MA-2903) |

The B-side was combined with the A-side in a ratio of 46 parts A-side to 100 parts B-side.

Example 3

| Transesterification | |
|---|---|
| 2.5% | Glycerin |
| 5.0% | Sorbitol |
| 92.5% | Blown soy oil |
| Elastomer Formation | |

B-side:
| | | |
|---|---|---|
| | 97% | Transesterified polyol formed above |
| | | Air Products DBU ® = urethane catalyst |
| | | (1,8 Diazabicyclo [5.4.0]) |
| | 3% | Dipropylene glycol |
| A-side: | | Modified monomeric MDI (Mondur ® MA-2903) |

The B-side was combined with the A-side in a ratio of 61 parts A-side to 100 parts B-side.

Example 4

| Transesterification | |
|---|---|
| 5.0% | Glycerin |
| 10.0% | Sorbitol |
| 85.0% | Blown soy oil |
| Elastomer Formation | |

B-side:
| | | |
|---|---|---|
| | 97% | Transesterified polyol formed above |
| | | Air Products DBU ® = urethane catalyst |
| | | (1,8 Diazabicyclo [5.4.01]) |
| | 3% | Dipropylene glycol |
| A-side: | | Modified monomeric MDI (Mondur ® MA-2903) |

The B-side was combined with the A-side in a ratio of 61 parts A-side to 100 parts B-side.

Example 5

| Transesterification | |
|---|---|
| 10.0% | Glycerin |
| 20.0% | Sorbitol |
| 70.0% | Blown soy oil |
| Elastomer Formation | |

B-side:
| | | |
|---|---|---|
| | | Transesterified polyol formed above |
| | | Air Products DBU ® = urethane catalyst |
| | | (1,8 Diazabicyclo [5.4.0]) |
| | 3.0 g | Dipropylene glycol |
| A-side: | | Modified monomeric MDI (Mondur ® MA-2903) |

The B-side was combined with the A-side in a ratio of 61 parts A-side to 100 parts B-side.

Example 6

| Transesterification | |
|---|---|
| 12.0% | Glycerin |
| 24.0% | Sorbitol |
| 12.0% | Polyurea polyol |
| 52.0% | Blown soy oil |
| Elastomer Formation | |

B-side:
| | |
|---|---|
| | Transesterified polyol formed above |
| | Heat (190° F.) was used to catalyze the reaction |
| | Butanediol (cross-linker) |
| A-side: | Modified monomeric MDI (Mondur ® MA-2903) |

Example 7

| Transesterification | |
|---|---|
| 5.0% | Glycerin |
| 10.0% | Sorbitol |
| 85% | Polyurea polyol and Blown soy oil mixture |
| | Elastomer Formation |

B-side:
| | | |
|---|---|---|
| | 40.0 g | Transesterified polyol formed above |
| | 0.3 g | Air Products DBU ® = urethane catalyst (1,8 Diazabicyclo [5.4.0]) |
| | 10.0 g | Polyether polyol (Bayer Multranol® 9151) |
| | 3.0 g | Dipropylene glycol |
| A-side: | | Modified monomeric MDI (Mondur ® MA-2903) |

The B-side was combined with the A-side in a ratio of 38 parts A-side to 100 parts B-side.

Example 8

| Transesterification | |
|---|---|
| 5.0% | Glycerin |
| 10.0% | Sorbitol |
| 85% | Polyurea polyol and Blown soy oil mixture |
| | Elastomer Formation |

B-side:
| | | |
|---|---|---|
| | 30.0 g | Transesterified polyol formed above |
| | 20.0 g | Polyether polyol (Bayer Multranol ® 9151) |
| | 3.0 g | Air Products DBU® = urethane catalyst (1,8 Diazabicyclo [5.4.0]) |
| | 3.0 g | Dipropylene glycol |
| A-side: | | Modified monomeric MDI (Mondur ® MA-2903) |

The B-side was combined with the A-side in a ratio of 31 parts A-side to 100 parts B-side.

Example 9

| Transesterification | |
|---|---|
| 5.0% | Glycerin |
| 10.0% | Sorbitol |
| 85.0% | Blown soy oil |
| | Elastomer Formation |

B-side:
| | | |
|---|---|---|
| | 50.0 g | Transesterified polyol formed above |
| | 0.4 g | Air Products DBU ® = urethane catalyst (1,8 Diazabicyclo [5.4.0]) |
| | 3.0 g | Dipropylene glycol |
| A-side: | | Modified monomeric MDI (Mondur ® MA-2903) |

The B-side was combined with the A-side in a ratio of 60 parts A-side to 100 parts B-side.

Example 10

| Transesterification | |
|---|---|
| 5.0% | Glycerin |
| 10.0% | Sorbitol |
| 5.0% | Polyurea polyol |
| 80.0% | Blown soy oil |
| | Elastomer Formation |

B-side:
| | | |
|---|---|---|
| | 40.0 g | Transesterified polyol formed above |
| | 0.4 g | Air Products DBU ® = urethane catalyst (1,8 Diazabicyclo [5.4.0]) |
| | 2.4 g | Dipropylene glycol |
| A-side: | | Modified monomeric MDI (Mondur ® MA-2903) |

The B-side was combined with the A-side in a ratio of 40 parts A-side to 100 parts B-side.

Example 11

| Transesterification | |
|---|---|
| 5.0% | Glycerin |
| 10.0% | Sorbitol |
| 5.0% | Polyurea polyol |
| 80.0% | Blown soy oil |
| | Elastomer Formation |

B-side:
| | | |
|---|---|---|
| | 40.0 g | Transesterified polyol formed above |
| | 0.4 g | Air Products DBU ® = urethane catalyst (1,8 Diazabicyclo [5.4.0]) |
| | 2.4 g | Dipropylene glycol |
| A-side: | | Modified monomeric MDI (Mondur ® MA-2903) |

The B-side was combined with the A-side in a ratio of 100 parts A-side to 100 parts B-side.

Example 12

| Transesterification | |
|---|---|
| 5.0% | Glycerin |
| 10.0% | Sorbitol |
| 12.0% | Polyurea polyol |
| 73.0% | Blown soy oil |
| | Elastomer Formation |

B-side:
| | | |
|---|---|---|
| | 50.0 g | Transesterified polyol formed above |
| | 0.4 g | Air Products DBU ® = urethane catalyst (1,8 Diazabicyclo [5.4.0]) |
| | 3.0 g | Dipropylene glycol |
| A-side: | | Modified monomeric MDI (Mondur ® MA-2903) |

The B-side was combined with the A-side in a ratio of 61 parts A-side to 100 parts B-side and cured at a temperature of 162° F.

Example 13

| Transesterification | |
|---|---|
| 5.0% | Glycerin |
| 10.0% | Sorbitol |
| 85.0% | Blown soy oil |
| Elastomer Formation | |

| B-side: | | |
|---|---|---|
| | 50.0 g | Transesterified polyol formed above |
| | 0.4 g | Air Products DBU ® = urethane catalyst (1,8 Diazabicyclo [5.4.0]) |
| | 3.0 g | Dipropylene glycol |
| A-side: | | Modified monomeric MDI (Mondur ® MA-2903) |

The B-side was combined with the A-side in a ratio of 80 parts A-side to 100 parts B-side and cured at a temperature of 166° F.

Example 14

| Transesterification | |
|---|---|
| 5.0% | Glycerin |
| 10.0% | Sorbitol |
| 85.0% | Blown soy oil |
| Elastomer Formation | |

| B-side: | | |
|---|---|---|
| | 50.0 g | Transesterified polyol formed above |
| | 0.4 g | Dibutyltin diacetate (T-1) - catalyst |
| | 3.0 g | Dipropylene glycol |
| A-side: | | Modified monomeric MDI (Mondur ® MA-2903) |

The B-side was combined with the A-side in a ratio of 61 parts A-side to 100 parts B-side and cured at a temperature of 153° F.

Example 15

| Transesterification | |
|---|---|
| 1.0% | (6.66g) Glycerin |
| 3.0% | (13.4g) Sorbitol |
| 400.0 g | Blown soy oil |

This mixture was heated at 196° F. for 1.5 hours.

Example 16

20.0 g of Glycerin heated and stirred at 178° F.
Introduced 40.0 g sorbitol slowly for about 4 minutes
Stayed milky until about 15 minute mark
At temperatures above 120° F., the solution was very fluid and clear. At temperatures under 120° F., the solution was clear; however, it was very viscous.
Added this mixture to 200.0 g of blown soy oil
200.0 g of blown soy oil heated to 178° F.
Introduced sorbitol, glycerin mixture as follows:
Added 10.0 g turned very cloudy within 30 seconds. Could not see the bottom of the beaker
Still very cloudy after 5 minutes and added 10.0 g
Viscosity increased and had to reduce paddle speed after 10 minutes
Viscosity reduced somewhat after about 18 minutes
A further reduction in viscosity after about 21 minutes
This was mixed in a 500 mL beaker with a magnetic paddle. The scientists were not able to see through the beaker. After about 21 minutes, a vortex appended in the surface indicating a further reduction in viscosity. At this time, the mixture lightened by a visible amount. Maintained heat and removed.
Reacted the new polyol with Modified Monomeric MDI, NCO-19.

| New Polyol | 100% |
|---|---|
| DBU | 0.03% |
| MDI | 50 p to100 p of about Polyol |

Reaction:
Cream time about 30 seconds
Tack free in about 45 seconds
Good physical properties after about 2 minutes
The reaction looked good, the material showed no signs of blow and seemed to be a good elastomer. It does however exhibit some signs of too much crosslinking and did not have the amount of elongation that would be optimal.
A comparative reaction run along side with the un-modified blown soy oil was not tack free at 24 hours.

Example 17

| Transesterification | |
|---|---|
| 1.0% | Glycerin |
| 3.0% | Sorbitol |
| 96.0% | Blown soy oil |
| Elastomer Formation | |

| B-side: | | |
|---|---|---|
| | 50.0 g | Transesterified polyol formed as in Example 15 |
| | 0.5 g | Dibutyltin diacetate (T1) - catalyst |
| | 3.0 g | Dipropylene glycol |
| A-side: | | Modified monomeric MDI (Mondur ® MA-2903) |

The B-side was combined with the A-side in a ratio of 61 parts A-side to 100 parts B-side and cured at a temperature of 154° F. for 4 minutes.

Example 18

| B-side: | | |
|---|---|---|
| | 50.0 g | Transesterified polyol formed from 20g Dipropylene Glycol, 5 g Glycerin, and 20 g sorbitol blended with 200 g blown soy oil |
| | 0.3 g | Air Products DBU ® = urethane catalyst (1,8 Diazabicyclo [5.4.0]) |
| A-side: | | Modified monomeric MD1 (Mondur ® MA-2903) |

The B-side was combined with the A-side in a ratio of 61 parts A-side to 100 parts B-side.

Example 19

| Transesterification | |
|---|---|
| 750 g | Blown soy oil |
| 150 g | Glycerin |
| 75 g | Cane sugar |

Example 20

B-side:
| | | |
|---|---|---|
| | 40.0 g | Transesterified polyol formed as in Example 19 |
| | 10.0 g | Polyether polyol (Bayer Multranol ® 9151) |
| | 1.5 g | Dipropylene Glycol |
| | 1.5 g | Butanediol |
| | 0.6 g | Dibutyltin diacetate |
| A-side: | | Modified monomeric MDI (Mondur ® MA-2903) |

The B-side was combined with the A-side in a ratio of 57 parts A-side to 100 parts B-side and was set up on 20 seconds.

Example 21

B-side:
| | | |
|---|---|---|
| | 50.0 g | Transesterified polyol formed as in Example 19 |
| | 10.0 g | Polyether polyol (Bayer Multranol ® 9151) |
| | 1.5 g | Dipropylene Glycol |
| | 1.5 g | Butanediol |
| | 0.6 g | Dibutyltin diacetate (T1) |
| A-side: | | Modified monomeric MDI (Mondur ® MA-2903) |

The B-side was combined with the A-side in a ratio of 71 parts A-side to 100 parts B-side.

Example 22

B-side:
| | | |
|---|---|---|
| | 40.0 g | Transesterified polyol formed as in Example 19 |
| | 10.0 g | Polyether polyol (Bayer Multranol ® 9151) |
| | 1.5 g | Dipropylene Glycol |
| | 1.5 g | Butanediol |
| | 0.6 g | Dibutyltin diacetate (T1) |
| A-side: | | Modified monomeric MDI (Mondur ® MA-2903) |

The B-side was combined with the A-side in a ratio of 45 parts A-side to 100 parts B-side.

Example 23

B-side:
| | | |
|---|---|---|
| | 100.0 g | Transesterified polyol formed as in Example 19 |
| | 20.0 g | Polyether polyol (Bayer Multranol ® 9151) |
| | 3.0 g | Dipropylene Glycol |
| | 3.0 g | Butanediol |
| | 0.7 g | Dibutyltin diacetate (T1) |
| | 228.6 | calcium carbonate filler |
| A-side: | | Modified monomeric MDI (Mondur ® MA-2903) |

The B-side was combined with the A-side in a ratio of 25 parts A-side to 100 parts B-side.

Example 24

B-side:
| | | |
|---|---|---|
| | 20.0 g | Transesterified polyol formed as in Example 19 |
| | 5.0 g | Transesterification from Example 25 |
| | 0.6 g | Dipropylene Glycol |
| | 0.7 g | Air Products DBU ® = urethane catalyst (1,8 Diazabicyclo [5.4.0]) |
| A-side: | | Modified monomeric MDI (Mondur ® MA-2903). |

The B-side was combined with the A-side in a ratio of 57 parts A-side to 100 parts B-side and was set up on 20 seconds.

Example 25

| Transesterification | |
|---|---|
| 100 g | Blown soy oil |
| 27 g | 63% glycerin and 37% cane sugar reaction product mixture |

The above was heated at a temperature of 230° F. and mixed for 15 minutes.

Example 26

| Transesterification | |
|---|---|
| 100.0 g | Blown soy oil |
| 13.5 g | 63% glycerin and 37% cane sugar reaction product mixture |

The above was heated at a temperature of 220° F.

Example 27

| Transesterification | |
|---|---|
| 400 g | Blown soy oil |
| 12 g | 33% Glycerin and 66% Sorbitol |

The glycerin and sorbitol product was preheated to 195° F. The total mixture was heated for 15 minutes at 202° F.

Example 28

B-side:
| | | |
|---|---|---|
| | 50.0 g | Transesterified polyol formed as in Example 27 |
| | 3.0 g | Dipropylene glycol |
| | 0.5 g | Dibutyltin diacetate (T1) - catalyst |
| A-side: | | Modified monomeric MDI (Mondur ® MA-2903) |

The B-side was combined with the A-side in a ratio of 61 parts A-side to 100 parts B-side at a temperature of 134° F. for 4 minutes.

Example 29

B-side:
| | | |
|---|---|---|
| | 50.0 g | Transesterified polyol formed as in Example 27 |
| | 3.0 g | Dipropylene glycol |
| | 0.8 g | Dibutyltin diacetate (T1) - catalyst |
| A-side: | | Modified monomeric MDI (Mondur ® MA-2903) |

The B-side was combined with the A-side in a ratio of 67 parts A-side to 100 parts B-side.

Example 30

B-side:
| | | |
|---|---|---|
| | 50.0 g | Transesterified polyol formed as in Example 27 |
| | 3.0 g | Dipropylene glycol |
| | 1.5 g | Water |
| | 0.8 g | Dibutyltin diacetate (T1) - catalyst |
| A-side: | | Modified monomeric MDI (Mondur ® MA-2903) |

The B-side was combined with the A-side in a ratio of 90 parts A-side to 100 parts B-side.

Example 31

B-side:
| | | |
|---|---|---|
| | 50.0 g | Transesterified polyol formed as in Example 27 |
| | 3.0 g | Dipropylene glycol |
| | 1.5 g | Water |
| | 0.8 g | Dibutyltin diacetate (T1) - catalyst |
| | 0.2 g | Silicon surfactant (Air Products ® DC193) |
| A-side: | | Modified monomeric MDI (Mondur ® MA-2903) |

The B-side was combined with the A-side in a ratio of 61 parts A-side to 100 parts B-side.

Example 32

B-side:
| | | |
|---|---|---|
| | 50.0 g | Transesterified polyol formed as in Example 27 |
| | 3.0 g | Dipropylene glycol |
| | 1.5 g | Water |
| | 0.6 g | Dibutyltin diacetate (T1) - catalyst |
| | 0.3 g | Tertiary block amine catalyst |
| A-side: | | Modified monomeric MDI (Mondur ® MA-2903) |

The B-side was combined with the A-side in a ratio of 74 parts A-side to 100 parts B-side.

Example 33

B-side:
| | | |
|---|---|---|
| | 50.0 g | Transesterified polyol formed as in Example 27 |
| | 3.0 g | Dipropylene glycol |
| | 1.5 g | Water |
| | 0.2 g | Silicon surfactant (Air Products ® DC193) |
| | 1.1 g | Dibutyltin diacetate (T1) - catalyst |
| A-side: | | Modified monomeric MDI (Mondur ® MA-2903) |

The B-side was combined with the A-side in a ratio of 55 parts A-side to 100 parts B-side.

Example 34

| Transesterification: | |
|---|---|
| 50.0 g | Blown soy oil |
| 6.0 g | 33% Glycerin and 66% Sorbitol reaction product mixture |

Example 35

B-side:
| | | |
|---|---|---|
| | 50.0 g | Transesterified polyol formed as in Example 34 |
| | 3.0 g | Dipropylene glycol |
| | 0.6 g | Dibutyltin diacetate (T1) - catalyst |
| A-side: | | Modified monomeric MDI (Mondur ® MA-2903) |

The B-side was combined with the A-side in a ratio of 61 parts A-side to 100 parts B-side at a temperature of 148° F. for 3 minutes.

Example 36

| Transesterification | |
|---|---|
| 20.0 g | Glycerin |
| 40.0 g | Brown cane sugar |

The above was heated at a temperature of 250° F. and mixed. 30 g of wet mass was recovered in a filter and removed.

Example 37

B-side:
- 50.0 g  Transesterified polyol formed as in Example 36
- 3.0 g   Dipropylene glycol
- 1.0 g   Dibutyltin diacetate (T1) - catalyst A-side:
- Modified monomeric MDI (Mondur ® MA-2903)

The B-side was combined with the A-side in a ratio of 67 parts A-side to 100 parts B-side at a temperature of 171° F. for one minute.

Example 38

B-side:
- 50.0 g  Transesterified polyol formed as in Example 36
- 3.0 g   Dipropylene glycol
- 1.0 g   Dibutyltin diacetate (T1) - catalyst A-side:
- Modified monomeric MDI (Mondur ® MA-2903)

The B-side was combined with the A-side in a ratio of 67 parts A-side to 100 parts B-side at a temperature of 146° F. for 1.5 minutes.

Example 39

B-side:
- 50.0 g  Transesterified polyol formed as in Example 36
- 3.0 g   Dipropylene glycol
- 0.5 g   Dibutyltin diacetate (T1) - catalyst A-side:
- Mondur ® MR light The B-side was combined with the A-side in a ratio of 20 parts A-side to 100 parts B-side at a temperature of 141° F. for 2 minutes.

Example 40

B-side:
- 50.0 g  Transesterified polyol formed as in Example 36
- 3.0 g   Dipropylene glycol
- 1.0 g   Dibutyltin diacetate (T1) - catalyst A-side:
- Mondur ® MR light The B-side was combined with the A-side in a 1:1 ratio A-side to B-side at a temperature of 152° F. and for 1 minute.

Example 41

| Transesterification | |
| --- | --- |
| 350.0 g | Blown soy oil |
| 60.0 g | Glycerin |
| 35.0 g | White cane sugar |

The above was heated at a temperature of 240° F.

Example 42

B-side:
- 50.0 g  Transesterified polyol formed as in Example 41 (preheated to 101° F.)
- 3.0 g   Dipropylene glycol
- 1.0 g   Dibutyltin diacetate (T1) - catalyst A-side:
- Modified monomeric MDI (Mondur ® MA-2903)

The B-side was combined with the A-side in a ratio of 61 parts A-side to 100 parts B-side at a temperature of 193° F. for 30 seconds.

Example 43

B-side:
- 50.0 g  Transesterified polyol formed as in Example 42 (preheated to 101° F.)
- 3.0 g   Dipropylene glycol
- 0.8 g   Dibutyltin diacetate (T1) - catalyst A-side:
- Mondur ® MR light The B-side was combined with the A-side in a ratio of 61 parts A-side to 100 parts B-side and reached a temperature of 227° F. for 20 seconds.

Example 44

| Transesterification | |
| --- | --- |
| 35.9 g | Glycerin |
| 6.9 g | Cane sugar |
| 20.0 g | Trimethylolpropane (preheated to 190° F.) |

30 g of the above mixture was combined with 300 g of blown soy oil.

Example 45

| | |
| --- | --- |
| Step 1 | Heated 60 g trimethylolpropane (melting point of about 58° C., about 136.4° F.) to liquid |
| Step 2 | Heated 30 g water and added 30 g cane sugar |
| Step 3 | Added 60 g water and cane sugar to 60 g trimethylolpropane and slowly raised the heat over 3 hours to 290° F. This drove off the water. |

Example 46

B-side:
- 20.0 g  Transesterified polyol formed as in Example 44
- 0.5 g   Dibutyltin diacetate (T1) - catalyst A-side:
- Modified monomeric MDI (Mondur ® MA-2903)

The B-side was combined with the A-side in a ratio of 40 parts A-side to 100 parts B-side.

Example 47

| Transesterification | |
|---|---|
| 1000 g | Glycerin |
| 500 g | Cane sugar |

The above was mixed at a temperature of 230° F. for 20 minutes.

Example 48

| Transesterification: | |
|---|---|
| 22.3 g | Reaction product formed as in Example 47 |
| 100.0 g | Blown soy oil |

The above mixture was heated at a temperature of 227° F. for 20 minutes.

Example 49

| | |
|---|---|
| 50 g | Water |
| 50 g | Cane sugar |

The above was mixed and heated at a temperature of 85° F. for 20 minutes.

Example 50

| Transesterification | |
|---|---|
| 20 g | Reaction mixture formed as in Example 53 |
| 100 g | Blown soy oil |

The above was heated at a temperature of 185° F. for 20 minutes, then heated to a temperature of 250° F. for 80 minutes.

Example 51

B-side:
  20.0 g  Transesterified polyol formed as in Example 50
  0.4 g   Dibutyltin diacetate (T1) - catalyst
A-side:   Mondur ® MR light The B-side was combined with the A-side in a ratio of 56 parts A-side to 100 parts B-side.

Example 52

B-side:
  20.0 g  Transesterified polyol formed as in Example 50
  0.8 g   Dibutyltin diacetate (T1) - catalyst
A-side:   Mondur ® MR light The B-side was combined with the A-side in a ratio of 54 parts A-side to 100 parts B-side.

Example 53

| Transesterification | |
|---|---|
| 3200 g | Blown soy oil (5% sugar by volume) |
| 48 g | 67% Glycerin and 37% Cane sugar mixture |

Example 54

B-side:
  60.0 parts by weight   Transesterified polyol formed as in Example 19
  40.0 parts by weight   Polyether Polyol (Bayer ® Multranol ® 3901)
  5.0 parts by weight    Dipropylene Glycol
  2.0 parts by weight    Dibutyltin diacetate (T1) - catalyst
  2.1 parts by weight    Water
  109.0 parts by weight  Calcium Carbonate (filler)
A-side:                  Mondur ® MR light The B-side was combined with the A-side in a ratio of 56 parts A-side to 100 parts B-side.

Example 55

B-side:
  50.0 g Transesterified polyol formed as in Example 19
  3.0 g Dipropylene glycol
  1.0 g Water
  0.8 g Dibutyltin diacetate (T1) - catalyst
  54.7 g Calcium Carbonate (filler)
A-side:   Bayer Corporation's Mondur ® MA-2901 (Isocyanate)

The B-side was combined with the A-side in a ratio of 40 parts A-side to 100 parts B-side.

Example 56

B-side:
  40.0 g  Transesterified polyol formed as in Example 53
  10.0 g  Polyether polyol
  1.5 g   Dipropylene glycol
  1.5 g   Butanediol
  1.0 g   Water
  55 g    Calcium Carbonate (filler)
A-side:   Modified monomeric MDI (Mondur ® MA-2903)

Example 57

| Transesterification | |
|---|---|
| 70.0 g | Trimethylolpropane |
| 33.0 g | Pentaethertrol |
| 60.0 g | Sugar |

The above was heated to a temperature of 237° F. and added 15.0 g of this reaction product to 100.0 g of blown soil oil.

Example 58

B-side:
- 50.0 g Transesterified polyol formed as in Example 53
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 41 parts A-side to 100 parts B-side at a temperature of 15.1° F. for 1 minute.

Example 59

B-side:
- 50.0 g Transesterified polyol formed as in Example 53
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 177° F. for 1 minute.

Example 60

B-side:
- 50.0 g Transesterified polyol formed as in Example 53
- 3.0 g Dipropylene glycol
- 3.0 g Dibutyltin diacetate (T1)

A-side: Modified monomeric MDI (Mondur ® MA-2903)

The B-side was combined with the A-side in a ratio of 45 parts A-side to 100 parts B-side at a temperature of 165° F. for 10 seconds.

Example 61

| Transesterification | |
|---|---|
| 200 g | Blown soy oil |
| 20 g | Trimethylolpropane |

The above was heated to a temperature of 220° F. for 30 minutes.

Example 62

B-side:
- 50.0 g Transesterified polyol formed as in Example 61
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 168° F. for 35 seconds.

Example 63

| Transesterification: | |
|---|---|
| 200 g | Blown soy oil |
| 20 g | Trimethylolpropane |

The above was heated at a temperature of 325° F. for 1 hour. The trimethylolpropane did not dissolve completely.

Example 64

B-side:
- 50.0 g Transesterified polyol formed as in Example 63
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 151° F. for 1 minute.

Example 65

| Transesterification | |
|---|---|
| 100.0 g | Blown soy oil |
| 5.9 g | Trimethylolpropane |

The above was heated at a temperature of 235° F.

Example 66

B-side:
- 50.0 g Transesterified polyol formed as in Example 65
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 162° F. for 1 minute.

Example 67

B-side:
- 50.0 g Transesterified polyol formed as in Example 65
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 166° F. for 1 minute.

Example 68

Transesterification
- 2000 g Blown soy oil
- 100 g Trimethylolpropane

The above was heated at a temperature of 200° F. for 2 hours.

Example 69

B-side:
- 50.0 g Transesterified polyol formed as in Example 68
- 3.0 g Dipropylene Glycol
- 1.0 g Dibutyltin Diacetate (T1)

A-side: Modified monomeric MDI (Mondur ® MA-2903)

The above was heated at a temperature of 166° F. for 1 minute.

Example 70

B-side:
- 50.0 g Transesterified polyol formed as in Example 68
- 4.0 g Dipropylene Glycol
- 1.4 g Dibutyltin Diacetate (T1)
- 1.3 g Water A-side: Modified monomeric MDI (Mondur ® MA-2903)

Example 71

B-side:
- 50.0 g Transesterified polyol formed as in Example 68
- 3.0 g Dipropylene Glycol
- 1.0 g Dibutyltin Diacetate (T1)

A-side: Modified monomeric MDI (Mondur ® MA-2903)

The B-side was combined with the A-side in a ratio of 61 parts A-side to 100 parts B-side at a temperature of 172° F. for 1 minute.

Example 72

B-side:
- 50.0 g Transesterified polyol formed as in Example 68
- 2.0 g Dibutyltin diacetate (T1)

A-side: Modified monomeric MDI (Mondur ® MA-2903)

The above was heated at a temperature of 135° F.

Example 73

Transesterification
- 200.0 g Blown soy oil
- 4.0 g Trimethylolpropane

The above was heated at a temperature of 205° F.

Example 74

B-side:
- 50.0 g Transesterified polyol formed as in Example 73
- 2.0 g Dibutyltin diacetate (T1)

A-side: Modified monomeric MDI (Mondur ® MA-2903)

The B-side was combined with the A-side in a ratio of 45 parts A-side to 100 parts B-side at a temperature of 126° F.

Example 75

Transesterification
- 400 g Blown soy oil
- 62 g 66.7% Glycerin and 33.3% cane sugar mixture The above mixture was heated at an average temperature of 205° F.

Example 76

B-side:
- 40.0 g Transesterified polyol formed as in Example 53
- 1.5 g Dipropylene Glycol
- 1.5 g Butanediol
- 0.4 g Dibutyltin Diacetate (T1)
- 10.0 g Polyether Polyol (Bayer Multranol ® 3901) ® 3901

A-side: Modified monomeric MDI (Mondur ® MA-2903)

The B-side was combined with the A-side in a ratio of 62 parts A-side to 100 parts B-side.

Example 77

B-side:
- 40.0 g Transesterified polyol formed as in Example 53
- 1.5 g Dipropylene Glycol
- 1.5 g Butanediol
- 0.4 g Dibutyltin Diacetate (T1)
- 10.0 g Polyether Polyol (Bayer Multranol ® 9151)

A-side: Modified monomeric MDI (Mondur ® MA-2903)

The B-side was combined with the A-side in a ratio of 62 parts A-side to 100 parts B-side.

Example 78

B-side:
- 40.0 g Transesterified polyol formed as in Example 75
- 1.5 g Dipropylene Glycol
- 1.5 g Butanediol
- 0.4 g Dibutyltin Diacetate (T1)

A-side: Modified monomeric MDI (Mondur ® MA-2903)

The B-side was combined with the A-side in a ratio of 42 parts A-side to 100 parts B-side.

Example 79

B-side:
- 20.0 g Transesterified polyol formed as in Example 75
- 0.4 g Dibutyltin Diacetate (T1)

A-side: Modified monomeric MDI (Mondur ® MA-2903)

The B-side was combined with the A-side in a ratio of 42 parts A-side to 100 parts B-side.

Example 80

B-side:
- 100.0 g Transesterified polyol formed as in Example 75
- 2.9 g Dibutyltin Diacetate (T1)

A-side: Modified monomeric MDI (Mondur ® MA-2903)

The B-side was combined with the A-side in a ratio of 44 parts A-side to 100 parts B-side.

Example 81

| Transesterification | |
|---|---|
| 350 g | Blown soy oil |
| 52 g | 66.7% Glycerin and 33.3% cane sugar mixture |

The above was heated at a temperature of 194° F. for 4 hours.

Example 82

B-side:
- 40.0 g Transesterified polyol formed as in Example 53
- 1.5 g Dipropylene Glycol
- 1.5 g Butanediol
- 0.3 g Dibutyltin Diacetate (T1)
- 10.0 g Polyether Polyol (Bayer ® Multranol ® 3901)
- 97.0 g Calcium Carbonate (filler)

A-side: Modified monomeric MDI (Mondur ® MA-2903)

The B-side was combined with the A-side in a ratio of 62 parts A-side to 100 parts B-side.

Example 83

B-side:
- 20.0 g Transesterified polyol formed as in Example 53
- 1.5 g Dipropylene Glycol
- 1.5 g Butanediol
- 0.4 g Dibutyltin Diacetate (T1)
- 0.4 g Dibutyltin Dilaurate (T12)
- 8.0 g Polyether Polyol (Bayer ® Multranol ® 3901)

A-side: Mondur ® MR Light

The B-side was combined with the A-side in a ratio of 70 parts A-side to 100 parts B-side.

Example 84

| Transesterification | |
|---|---|
| 400.0 g | Blown soy oil |
| 6.0 g | Vinegar (to add acidic proton); hydrogen chloride may also be added |
| 60.0 g | 66.7% Glycerin and 33.3% Cane sugar mixture |

The above was heated at a temperature of 210° F. for 1 hour.

Example 85

B-side:
- 40.0 g Transesterified polyol formed as in Example 84
- 0.8 g Dibutyltin Diacetate (T1)

A-side: Modified monomeric MDI (Mondur ® MA-2903)

The B-side was combined with the A-side in a ratio of 42 parts A-side to 100 parts B-side.

Example 86

B-side:
  40.0 g  Transesterified polyol formed as in Example 84
  0.8 g   Dibutyltin Diacetate (T1)
A-side:   Modified monomeric MDI (Mondur ® MA-2903)

The B-side was combined with the A-side in a ratio of 70 parts A-side to 100 parts B-side.

Example 87

Transesterification

First step:
  80.0 g  66.7% Glycerin and 33.3% Cane sugar
  0.8 g   Vinegar

The above was heated at a temperature of 260° F. for 30 minutes.

Second step:
60 g of the above reaction product was reacted with 400 g blown soy oil and mixed for 30 minutes.

Example 88

B-side:
  50.0 g  Transesterified polyol formed as in Example 87
  1.0 g   Dibutyltin diacetate (T1)
A-side:   Modified monomeric MDI (Mondur ® MA-2903)

The B-side was combined with the A-side in a ratio of 42 parts A-side to 100 parts B-side.

Example 89

B-side:
  20.0 g  Transesterified polyol formed as in Example 87
  0.5 g   Dibutyltin diacetate (T1)
  20.0 g  Bayer ® Multranol ®
A-side:   Mondur ® MR Light The B-side was combined with the A-side in a ratio of 92 parts A-side to 100 parts B-side at a temperature of 240° F. for 20 seconds.

Example 90

B-side:
  50.0 g  Blown soy oil
  1.7 g   Dibutyltin diacetate (T1)
A-side:   Modified monomeric MDI (Mondur ® MA-2903)

The B-side was combined with the A-side in a ratio of 42 parts A-side to 100 parts B-side.

Example 91

Transesterification 50.0 g   Blown soy oil
  100.0 g  Bayer ® Multranol ® 9185

The above was heated to a temperature of 100° F. for 5 hours.

Example 92

B-side:
  50.0 g  Transesterified polyol formed as in Example 91
  0.7 g   Dibutyltin diacetate (T1)
A-side:   Mondur ® MR Light The B-side was combined with the A-side in a ratio of 56 parts A-side to 100 parts B-side.

Example 93

Transesterification 80.0 g  Blown soy oil
  20.0 g  Polyether Polyol Bayer ® Multranol ® 3901

The above was heated to a temperature of 100° C.

Example 94

B-side:
  50.0 g  Blown soy oil
  0.8 g   Dibutyltin Dilaurate (T12)
  5.0 g   Butanediol
A-side:   Modified monomeric MDI (Mondur ® MA-2903)

The B-side was combined with the A-side in a ratio of 64 parts A-side to 100 parts B-side at a temperature of 167° F. for 90 seconds.

Example 95

B-side:
  50.0 g  Blown soy oil
  15.0 g  Butanediol
  0.8 g   Dibutyltin Dilaurate (T12)
A-side:   Modified monomeric MDI (Mondur ® MA-2903)

The B-side was combined with the A-side in a ratio of 131 parts A-side to 100 parts B-side at a temperature of 224° F. for 20 seconds.

Example 96

| | |
|---|---|
| 2000 g | Transesterified polyol formed as in Example 80 |
| 6 g | Dipropylene glycol |
| 6 g | Butanediol |
| 40 g | Polyether Polyol (Bayer ® Multranol ® 3901) |

Example 97

B-side:
    50.0 g Transesterified prepolymer polyol formed as in Example 96
    0.3 g Dibutyltin Dilaurate (T12)
A-side: Modified monomeric MDI (Mondur ® MA-2903)

The B-side was combined with the A-side in a ratio of 62 parts A-side to 100 parts B-side for 120 seconds.

Example 98

B-side:
    50.0 g Transesterified prepolymer polyol formed as in Example 96
    0.2 g Dibutyltin Dilaurate (T12)
A-side: Modified monomeric MDI (Mondur ® MA-2903)

The B-side was combined with the A-side in a ratio of 62 parts A-side to 100 parts B-side for 160 seconds.

Example 99

B-side:
    50.0 g Transesterified prepolymer polyol formed as in Example 96
    0.4 g Dibutyltin Dilaurate (T12)
A-side: Modified monomeric MDI (Mondur ® MA-2903)

The B-side was combined with the A-side in a ratio of 62 parts A-side to 100 parts B-side for 80 seconds.

Example 100

B-side:
    40.0 g Transesterified prepolymer polyol formed as in Example 96
    0.2 g Dibutyltin Dilaurate (T12)
A-side: Mondur ® MR Light mixed with 15% blown soy oil
    for 120 seconds.

The B-side was combined with the A-side in a ratio of 62 parts A-side to 100 parts B-side.

Example 101

| Transesterification | |
|---|---|
| 400 g | Blown soy oil |
| 60 g | 66.7% Glycerin and 33% Cane sugar mixture |

The above was heated at a temperature of 198° F. for 5 hours.

Example 102

B-side:
    50.0 g Transesterified polyol formed as in Example 101
    0.8 g Dibutyltin Dilaurate (T12)
A-side: Modified monomeric MDI (Mondur ® MA-2903)

The B-side was combined with the A-side in a ratio of 42 parts A-side to 100 parts B-side at a temperature of 149° F. for 260 seconds.

Example 103

B-side:
    40.0 g Transesterified polyol formed as in Example 81
    0.9 g Dibutyltin Dilaurate (T12)
    10.0 g Bayer ® Multranol ®
A-side: Mondur ® MR Light The B-side was combined with the A-side in a ratio of 56 parts A-side to 100 parts B-side at a temperature of 189° F. for 190 seconds.

Example 104

B-side:
    40.0 g Transesterified polyol formed as in Example 81
    3.0 g Butanediol
    0.9 g Dibutyltin Dilaurate (T12)
    10.0 g Bayer ® Multranol ®
A-side: Mondur ® MR Light The above was heated at a temperature of 220° F. for 116 seconds.

Example 105

| Transesterification | |
|---|---|
| 400 g | Blown soy oil |
| 60 g | 66.7% Glycerin and 33.3% Cane Sugar |

Example 106

B-side:
- 50.0 g  Transesterified polyol formed as in Example 81
- 0.8 g  Dibutyltin Dilaurate (T12)

A-side:  Modified monomeric MDI (Mondur® MA-2903)

The B-side was combined with the A-side in a ratio of 70 parts A-side to 100 parts B-side.

Example 107

B-side:
- 50.0 g  Transesterified polyol formed as in Example 101
- 0.9 g  Dibutyltin Dilaurate (T12)

A-side:  Modified monomeric MDI (Mondur® MA-2903)

The B-side was combined with the A-side in a ratio of 14 parts A-side to 100 parts B-side.

Example 108

Transesterification
- 200.0 g  Blown soy oil
- 14.3 g  Honey

The above was heated at a temperature of 200° F. for 3 hours.

Example 109

B-side:
- 50.0 g  Transesterified polyol formed as in Example 81
- 0.1 g  Dibutyltin Dilaurate (T12)
- 10.0 g  Polyether Polyol (Bayer® Multranol® 3901)
- 1.5 g  Dipropylene glycol
- 1.5 g  Butanediol A-side:  Modified monomeric MDI (Mondur® MA-2903)

The B-side was combined with the A-side in a ratio of 62 parts A-side to 100 parts B-side.

Example 110

B-side:
- 40.0 g  Transesterified polyol formed as in Example 81
- 0.2 g  Dibutyltin Dilaurate (T12)
- 10.0 g  Polyether Polyol (Bayer® Multranol® 3901)
- 1.5 g  Dipropylene glycol
- 1.5 g  Butanediol
- 0.2 g  Air Products DBU® = urethane catalyst (1,8 Diazabicyclo [5.4.0])

A-side:  Modified monomeric MDI (Mondur® MA-2903)

The B-side was combined with the A-side in a ratio of 62 parts A-side to 100 parts B-side.

Example 111

B-side:
- 80.0 g  Transesterified polyol formed as in Example 81
- 20.0 g  Polyether Polyol (Bayer® Multranol® 3901)
- 3.0 g  Dipropylene glycol
- 3.0 g  Butanediol
- 0.4 g  Air Products DBU® = urethane catalyst (1,8 Diazabicyclo [5.4.0])

A-side:  Modified monomeric MDI (Mondur® MA-2903)

The B-side was combined with the A-side in a ratio of 62 parts A-side to 100 parts B-side.

Example 112

B-side:
- 80.0 g  Transesterified polyol formed as in Example 81
- 20.0 g  Polyether Polyol (Bayer® Multranol® 3901)
- 3.0 g  Dipropylene glycol
- 3.0 g  Butanediol
- 0.6 g  Air Products DBU® = urethane catalyst (1,8 Diazabicyclo [5.4.0])

A-side:  Modified monomeric MDI (Mondur® MA-2903)

The B-side was combined with the A-side in a ratio of 62 parts A-side to 100 parts B-side.

Example 113

B-side:
- 50.0 g  Transesterified polyol formed as in Example 81
- 0.8 g  Dibutyltin Dilaurate (T12)
- 10.0 g  Polyether Polyol (Bayer® Multranol® 3901)
- 62.0 g  Calcium Carbonate filler A-side:  Mondur® MR Light The B-side was combined with the A-side in a ratio of 56 parts A-side to 100 parts B-side.

Example 114

B-side:
- 50.0 g  Transesterified polyol formed as in Example 81
- 0.2 g  Dibutyltin Dilaurate (T12)
- 0.2 g  Air Products DBU® = urethane catalyst (1,8 Diazabicyclo [5.4.0])

A-side:
- 20%  Modified monomeric MDI (Mondur® MA-2903)
- 80%  Mondur® MR Light

The B-side was combined with the A-side in a ratio of 62 parts A-side to 100 parts B-side.

Example 115

| | Transesterification |
|---|---|
| 389.0 g | Blown soy oil |
| 13.0 g | Dipropylene glycol |
| 31.6 g | Polyether Polyol (Bayer ® Multranol ® 3901) |
| 381.5 g | Dibutyltin Dilaurate (T12) |

Example 116

| | | |
|---|---|---|
| B-side: | 40.0 g | Transesterified polyol formed as in Example 81 |
| | 10.0 g | Polyether Polyol (Bayer ® Multranol 9196) |
| | 0.4 g | Dibutyltin Dilaurate (T12) |
| A-side: | | |
| | 20.0 g | Modified monomeric MDI (Mondur ® MA-2903) |
| | 80.0 g | Mondur ® MR Light |

The B-side was combined with the A-side in a ratio of 82 parts A-side to 100 parts B-side.

Example 117

| | | |
|---|---|---|
| B-side: | 40.0 g | Transesterified polyol formed as in Example 101 |
| | 0.1 g | Dibutyltin Dilaurate (T12) |
| | 1.5 g | Dipropylene glycol |
| | 10.0 g | Polyether Polyol (Bayer ® Multranol ® 3901) |
| | 0.4 g | Air Products DBU ® = urethane catalyst (1,8 Diazabicyclo [5.4.0]) |
| A-side: | | Modified monomeric MDI (Mondur ® MA-2903) |

The B-side was combined with the A-side in a ratio of 72 parts A-side to 100 parts B-side.

Example 118

| | | |
|---|---|---|
| B-side: | 50.0 g | Transesterified polyol formed as in Example 81 |
| | 0.5 g | Dibutyltin Dilaurate (T12) |
| | 2.0 g | Butanediol |
| | 20.0 g | Polyether Polyol (Bayer ® Multranol ® 9196) |
| A-side: | | |
| | 20% | Modified monomeric MDI (Mondur ® MA-2903) |
| | 80% | Mondur ® MR Light |

The B-side was combined with the A-side in a ratio of 88 parts A-side to 100 parts B-side.

Example 119

| | | |
|---|---|---|
| B-side: | 50.0 g | Transesterified polyol formed as in Example 81 |
| | 20.0 g | Polyether Polyol (Bayer ® Multranol ® 9196) |
| | 0.5 g | Dibutyltin Dilaurate (T12) |
| | 2.0 g | Dipropylene Glycol |
| A-side: | 20 g | Modified monomeric MDI (Mondur ® MA-2903) |
| | 80 g | Mondur ® MR Light |

Example 120

Water Blown TDI Seating-Type Foam

| | | |
|---|---|---|
| B-side: | 50.0 g | Transesterified blown soy oil |
| | 50.0 g | Conventional polyol (3 Functional, 28 OH, 6000 Molecular weight, 1100 viscosity) |
| | 0.8 g | Non-acid blocked Dibutyltin dilaurate catalyst |
| | 0.8 g | Flexible blowing catalyst (Bis(N,N, dimethylaminoethyl)ether), |
| | 1.0 g | Flexible foam silicon surfactant |
| | 1.0 g | Water |
| A-side: | | 2,4-Toluene Diisocyanate (TDI) |

The B-side was combined with the A-side in a ratio of 40 parts A-side to 100 parts B-side.

Example 121

Hydrocarbon Blown TDI Seating-Type Foam

| | | |
|---|---|---|
| B-side: | 50.0 g | Transesterified blown soy oil |
| | 50.0 g | Conventional polyol (3 Functional, 28 OH, 6000 Molecular weight, 1100 viscosity) |
| | 0.8 g | Non-acid blocked Dibutyltin Dilaurate catalyst |
| | 0.8 g | Flexible blowing catalyst (Bis(N,N,dimethylaminoethyl)ether) |
| | 1.0 g | Flexible foam silicone surfactant |
| | 4.0 g | Cyclopentane, or other suitable blowing agents |
| A-side: | | 2,4-Toluene Diisocyanate (TDI) |

The B-side was combined with the A-side in a ratio of 40 parts A-side to 100 parts B-side.

Example 122

Water Blown MDI Seating-Type Foam

| | | |
|---|---|---|
| B-side: | 100.0 g | Transesterified blown soy oil |
| | 1.0 g | Flexible foam surfactant |
| | 1.6 g | Non-acid blocked Dibutyltin Dilaurate catalyst |
| | 3.0 g | Water |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 65 parts A-side to 100 parts B-side.

Example 123

Hydrocarbon Blown MDI Seating-Type Foam

| | | |
|---|---|---|
| B-side: | 100.0 g | Transesterified blown soy oil |
| | 1.0 g | Flexible foam surfactant |
| | 1.6 g | Non-acid blocked Dibutyltin Dilaurate catalyst |
| | 6.0 g | Cyclopentane, or other suitable blowing agent |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 65 parts A-side to 100 parts B-side.

Example 124

Water Blown Higher Rebound MDI Searing-Type Foam

| | | |
|---|---|---|
| B-side: | 50.0 g | Transesterified blown soy oil |
| | 50.0 g | Conventional polyol (3-functional, 28 OH, 6000 molecular weight, 1100 viscosity) |
| | 1.0 g | Flexible foam surfactant |
| | 0.3 g | Non-acid blocked Dibutyltin Dilaurate catalyst |
| | 0.4 g | Non-acid blocked Alkyltin mercaptide catalyst |
| | 3.0 g | Water |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 62 parts A-side to 100 parts B-side.

Example 125

Hydrocarbon Blown Higher Rebound MDI Searing-Type Foam

| | | |
|---|---|---|
| B-side: | 50.0 g | Transesterified blown soy oil |
| | 50.0 g | Conventional polyol (3 Functional, 28 OH, 6000 Molecular weight, 1100 Viscosity) |
| | 1.0 g | Flexible foam surfactant |
| | 0.3 g | Non-acid blocked Dibutyltin Dilaurate catalyst |
| | 0.4 g | Non-acid blocked Alkyltin mercaptide catalyst |
| | 6.0 g | Cyclopentane, or other suitable blowing agents |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 62 parts A-side to 100 parts B-side.

Example 126

Water Blown Lightweight Rigid Urethane Material

| | | |
|---|---|---|
| B-side: | 50.0 g | Transesterified blown soy oil |
| | 1.2 g | Non-acid blocked Dibutyltin Dilaurate catalyst |
| | 1.0 g | Water |
| A-side: | 100% | Polymeric MDI (Methylenebisdipenyl diisocyanate) (31.9% NCO, 200 Viscosity, 132 Equivalent weight, 2.8 Functional) |

The B-side was combined with the A-side in a ratio of 70 parts A-side to 100 parts B-side.

Example 127

Hydrocarbon Blown Lightweight Rigid Urethane Material

| | | |
|---|---|---|
| B-side: | 100.0 g | Transesterified blown soy oil |
| | 1.2 g | Non-acid blocked Dibutyltin Dilaurate catalyst |
| | 3.0 g | Cyclopentane, or other suitable blowing agents |
| A-side: | 100% | Polymeric MDI (Methylenebisdipenyl diisocyanate) (31.9% NCO, 200 Viscosity, 132 Equivalent weight, 2.8 Functional) |

The B-side was combined with the A-side in a ratio of 70 parts A-side to 100 parts B-side.

Example 128

Dense Rigid Urethane Material

| | | |
|---|---|---|
| B-side: | 100.0 g | Transesterified blown soy oil |
| | 1.2 g | Non-acid blocked Dibutyltin Dilaurate catalyst |
| A-side: | 100% | Polymeric MDI (Methylenebisdipenyl diisocyanate) (31.9% NCO, 200 Viscosity, 132 Equivalent weight, 2.8 Functional) |

The B-side was combined with the A-side in a ratio of 70 parts A-side to 100 parts B-side.

Example 129

Very Dense Rigid Urethane Material

| | | |
|---|---|---|
| B-side: | 100.0 g | Transesterified blown soy oil |
| | 1.2 g | Non-acid blocked Dibutyltin Dilaurate catalyst |
| A-side: | 100% | Polymeric MDI (Methylenebisdipenyl diisocyanate) (31.9% NCO, 200 Viscosity, 132 Equivalent weight, 2.8 Functional) |

The B-side was combined with the A-side in a ratio of 110 parts A-side to 100 parts B-side.

Example 130

Semi-Flexible Carpet Backing Material

| | | |
|---|---|---|
| B-side: | 80.0 g | Transesterified blown soy oil |
| | 20.0 g | Conventional polyol (2 Functional, 28 OH, 4000 Molecular weight, 820 Viscosity) |
| | 0.2 g | Non-acid blocked Dibutyltin Dilaurate catalyst |
| | 0.5 g | Non-acid blocked Alkyltin mercaptide catalyst |
| | 4.0 g | Dipropylene glycol |
| A-side: | 100% | Monomeric MDI (methylenebisdiphenyl diisocyanate) (23% NCO, 500 Viscosity, 183 Equivalent weight, 2 Functional) |

The B-side was combined with the A-side in a ratio of 45 parts A-side to 100 parts B-side.

Example 131

Semi-Flexible Carpet Backing Material

| | | |
|---|---|---|
| B-side: | 80.0 g | Blown soy oil |
| | 20.0 g | Conventional polyol (2 Functional, 28 OH, 4000 Molecular weight, 820 Viscosity) |
| | 0.2 g | Non-acid blocked Dibutyltin Dilaurate catalyst |
| | 0.5 g | Non-acid blocked Alkyltin mercaptide catalyst |
| | 4.0 g | Dipropylene glycol |
| A-side: | 50% | 4,4-MDI (methylenebisdiphenyl diisocyanate) Isocyanate |
| | 50% | 2,4-MDI (methylenebisdiphenyl diisocyanate)Isocyanate mixture (33.6% NCO, 10 Viscosity, 125 Equivalent weight, 2 Functional) |

The B-side was combined with the A-side in a ratio of 34 parts A-side to 100 parts B-side.

Example 132

Flexible Carpet Padding Material

| | | |
|---|---|---|
| B-side: | 85.0 g | Transesterified blown soy oil |
| | 7.5 g | Conventional polyol (3 Functional, 28 OH, 4000 Molecular weight, 1100 Viscosity) |
| | 7.5 g | Conventional polyol (4 Functional, 395 OH, 568 Molecular weight, 8800 Viscosity) |
| | 0.1 g | Non-acid blocked Dibutyltin Dilaurate catalyst |
| | 0.2 g | Non-acid blocked Alkyltin mercaptide catalyst |
| | 2.0 g | Dipropylene glycol |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 70 parts A-side to 100 parts B-side.

Example 133

Fast-Set Hard Skin Coating Material

| | | |
|---|---|---|
| B-side: | 100.0 g | Transesterified blown soy oil |
| | 1.0 g | Flexible foam surfactant |
| | 0.8 g | Non-acid blocked Dibutyltin Dilaurate catalyst |
| | 0.8 g | Fast acting Amicure DBU ® (Bicyclic Amidine) catalyst |
| A-side: | 100% | Isocyanate terminated PPG (polypropylene ether glycol) Prepolymer (19% NCO, 400 Viscosity, 221 Equivalent weight, 2 Functional) |

The B-side was combined with the A-side in a ratio of 68 parts A-side to 100 parts B-side.

Example 134

Wood Molding Substitute Material

| | | |
|---|---|---|
| B-side: | 100.0 g | Transesterified blown soy oil |
| | 2.0 g | Trimethylolpropane |
| | 1.0 g | Non-acid blocked Dibutyltin Dilaurate catalyst |
| A-side: | 100% | Polymeric MDI (methylenebisdiphenyl diisocyanate) (31.9% NCO, 200 Viscosity, 132 Equivalent weight, 2.8 Functional) |

The B-side was combined with the A-side in a ratio of 80 parts A-side to 100 parts B-side.

Example 135

Semi-Rigid Floral Foam Type Material

| | | |
|---|---|---|
| B-side: | 100.0 g | Transesterified blown soy oil |
| | 0.5 g | Non-acid blocked Dibutyltin Dilaurate catalyst |
| | 0.5 g | Fast acting Amicure DBU (Bicyclic amidine) catalyst |
| | 5.0 g | Water |
| A-side: | 100% | Polymeric MDI (methylenebisdiphenyl diisocyanate) (31.9% NCO, 200 Viscosity, 132 Equivalent weight, 2.8 Functional) |

The B-side was combined with the A-side in a ratio of 70 parts A-side to 100 parts B-side. A colorant (green) may be added if desired.

While vegetable oil based transesterified polyols are preferred in urethane production, an alternative embodiment of the present invention includes a cellular material that is the reaction product of an A-side and a B-side, where the A-side is comprised of a diisocyanate and the B-side comprises a vegetable oil, a cross-linking agent comprised of a multi-functional alcohol, and a catalyst. This alternative further comprises a method for preparing a cellular material comprising the reactive product of an A-side comprised of a prepolymer diisocyanate and a B-side. The B-side comprises a first vegetable oil, a cross-linking agent comprised of a multi-functional alcohol, a catalyst, and a blowing agent.

Yet another aspect of this alternative invention is a method of preparing a cellular material comprising the steps of combining an A-side material with a B-side material. The A-side comprises a diisocyanate and the B-side material comprises a vegetable oil, a cross-linking agent comprised of a multifunctional alcohol, a catalyst, and a blowing agent.

There are several methods of application and production available for either the vegetable oil based transesterified polyol application or the alternative non-transesterified polyol application to carpeting material for use as a pre-coat carpet backing. The above description is considered that of the preferred embodiments only.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of producing a transesterified polyol having increased functionality comprising:
   providing a first compound having multiple functional hydroxyl groups; a blown vegetable oil having fatty acids in triglyceride form chosen from the group consisting of a blown soybean oil, a blown rapeseed oil, a blown cottonseed oil, a blown palm oil, a blown safflower oil, a blown sunflower oil, a blown canola oil, a blown linseed oil and a blown coconut oil; and a transesterification catalyst;
   forming a combination that includes the first compound having multiple functional hydroxyl groups, the transesterification catalyst, and the blown vegetable oil;
   heating the blown vegetable oil and the first compound having multiple functional hydroxyl groups; and
   forming the transesterified polyol that is derived from the blown vegetable oil and having increased functionality compared to the blown vegetable oil by transesterification between one of the fatty acids of the heated blown vegetable oil and one of the functional hydroxyl groups of the heated first compound having multiple functional hydroxyl groups.

2. The method of claim 1, wherein the transesterification catalyst comprises tetra-2-ethylhexyl titonate and the first compound is an alcohol having multiple functional hydroxyl groups.

3. The method of claim 2, wherein the blown vegetable oil is a blown soybean oil.

4. The method of claim 3, wherein the combination further comprises a polyurea polyol.

5. The method of claim 1, wherein the first compound having multiple functional hydroxyl groups is a petroleum derived polyether polyol.

6. The method of claim 1, wherein the combination further includes a second compound having multiple functional hydroxyl groups and the first compound having multiple functional hydroxyl groups is an alcohol chosen from the group consisting of trimethylolpropane, pentaethertrol, and glycerin.

7. The method of claim 6, wherein the second compound having multiple functional hydroxyl groups comprises a second compound having multiple functional hydroxyl groups chosen from the group consisting of a monosaccharide, disaccharide, a polysaccharide, a sugar alcohol, cane sugar, and honey.

8. The method of claim 7, wherein the second-compound having multiple functional hydroxyl groups is a sugar alcohol.

9. The method of claim 8, wherein the sugar alcohol is sorbitol.

10. The method of claim 9, wherein the transesterification catalyst is a tetra-2-ethylhexyl titonate.

11. The method of claim 10, wherein the blown vegetable oil comprises a blown soybean oil and the combination is heated to a temperature of from 198° F. to 250° F.

12. A method of producing a polyol for use in producing polyurethanes comprising:
   providing a first compound having multiple functional hydroxyl groups; a polyol derived from petroleum having multiple functional hydroxyl groups; and a blown vegetable oil wherein the blown vegetable oil comprises a blown vegetable oil chosen from the group consisting of a blown soybean oil, a blown rapeseed oil, a blown cottonseed oil, a blown palm oil, a blown safflower oil, a blown sunflower oil, a blown canola oil, a blown linseed oil and a blown coconut oil;
   forming a combination of components comprising the first compound having multiple functional hydroxyl groups, the blown vegetable oil, and the polyol derived from petroleum having multiple functional hydroxyl groups; and
   heating the combination of components to a temperature to form a transesterified polyol with increased functionality formed using the blown vegetable oil by forming an ester linkage between a fatty acid of the blown vegetable oil and one of the hydroxyl groups of the first compound having multiple functional hydroxyl groups or one of the hydroxyl groups of the polyol derived from petroleum having multiple functional hydroxyl groups wherein the transesterified polyol with increased functionality has at least three hydroxyl groups and greater hydroxyl functionality than the blown vegetable oil prior to the ester linkage being formed and is used to form a polyurethane product.

13. The method of claim 12, wherein the combination of components further comprises a transesterification catalyst, and wherein the first compound is an alcohol having multiple functional hydroxyl groups.

14. The method of claim 13, wherein the transesterification catalyst comprises tetra-2-ethylhexyl titonate.

15. The method of claim 13, wherein the blown vegetable oil comprises a blown soybean oil.

16. The method of claim 15, wherein the polyol derived from petroleum is a polyurea polyol.

17. The method of claim 12, wherein the method further comprises the step of adding an alkene oxide to the combination of components to further increase the functionality of the polyol with increased functionality by alkoxylation, wherein the alkene oxide comprises an alkene oxide chosen from the group consisting of propylene oxide, ethylene oxide, and butylene oxide.

18. The method of claim 17, wherein the combination of components further includes a first multifunctional compound and the first multifunctional compound comprises a multifunctional compound chosen from the group consisting of a monosaccharide, disaccharide, a polysaccharide, a sugar alcohol, cane sugar, and honey.

19. The method of claim 15, wherein the transesterification catalyst comprises a tetra-2-ethylhexyl titonate.

20. The method of claim 17, wherein the combination of components further comprises a transesterification catalyst and wherein the blown vegetable oil comprises a blown soybean oil.

* * * * *